US011238211B2

(12) United States Patent
van de Kerkhof et al.

(10) Patent No.: US 11,238,211 B2
(45) Date of Patent: Feb. 1, 2022

(54) AUTOMATIC HYPERLINKING OF DOCUMENTS

(71) Applicant: Google LLC, Mountain View, CA (US)

(72) Inventors: Jan van de Kerkhof, Zürich (CH); Balint Miklos, Zürich (CH); Amr Abdelfattah, Adliswil (CH); Tobias Kaufmann, Zürich (CH); László Lukacs, Zürich (CH); Bjarke Ebert, Canton of Zug (CH); Victor Anchidin, Zürich (CH); Brian Strope, Palo Alto, CA (US); Heeyoung Lee, Sunnyvale, CA (US); Yun-hsuan Sung, Mountain View, CA (US); Noah Constant, Cupertino, CA (US); Neil Smith, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/978,658

(22) PCT Filed: Mar. 14, 2019

(86) PCT No.: PCT/US2019/022327
§ 371 (c)(1),
(2) Date: Sep. 4, 2020

(87) PCT Pub. No.: WO2020/091829
PCT Pub. Date: May 7, 2020

(65) Prior Publication Data
US 2020/0410157 A1 Dec. 31, 2020

Related U.S. Application Data

(60) Provisional application No. 62/752,621, filed on Oct. 30, 2018.

(51) Int. Cl.
*G06F 17/00* (2019.01)
*G06F 40/134* (2020.01)
(Continued)

(52) U.S. Cl.
CPC .......... *G06F 40/134* (2020.01); *G06F 40/166* (2020.01); *G06F 40/30* (2020.01)

(58) Field of Classification Search
CPC ....... G06F 40/134; G06F 40/30; G06F 40/166
See application file for complete search history.

(56) References Cited

U.S. PATENT DOCUMENTS 7,117,432 B1 * 10/2006 Shanahan ............. G06F 16/353
715/210
8,335,527 B2 12/2012 Myaeng et al.
(Continued)

OTHER PUBLICATIONS

International Search Report and Written Opinion of International Application No. PCT/US2019/022327, dated Jul. 18, 2019, 17 pp.
(Continued)

*Primary Examiner* — Laurie A Ries
(74) *Attorney, Agent, or Firm* — Shumaker & Sieffert, P.A.

(57) ABSTRACT

A system may use a machine-learned model to determine whether to classify a sequence of one or more words within a first document that is being edited as a candidate hyperlink based at least in part on context associated with the first document. In response to classifying the sequence of one or more words as the candidate hyperlink, the system may use the machine-learned model and based at least in part on the sequence of one or more words and the context to determine one or more candidate document to be hyperlinked from the sequence of one or more words. In response to receiving an indication of a second document being selected out of the one or more candidate documents, the system may modify (Continued)

the first document to associate the sequence of one or more words with a hyperlink to the second document.

20 Claims, 12 Drawing Sheets

(51) Int. Cl.
    *G06F 40/166*    (2020.01)
    *G06F 40/30*    (2020.01)

(56) References Cited

U.S. PATENT DOCUMENTS

| | | | |
|---|---|---|---|
| 2010/0179933 A1* | 7/2010 | Bai | G06F 16/3334 706/12 |
| 2010/0251086 A1 | 9/2010 | Haumont et al. | |
| 2010/0281057 A1* | 11/2010 | Dicke | G06F 40/134 707/780 |
| 2012/0297278 A1* | 11/2012 | Gattani | G06F 16/367 715/205 |
| 2013/0103389 A1 | 4/2013 | Gattani et al. | |
| 2013/0158981 A1* | 6/2013 | Ceylan | G06F 16/958 704/9 |
| 2013/0174002 A1* | 7/2013 | Jones | G06F 16/9558 715/208 |
| 2016/0112362 A1* | 4/2016 | Perazzo | G06Q 10/063114 455/466 |
| 2017/0102845 A1* | 4/2017 | Ozuysal | G06F 3/0482 |
| 2017/0185596 A1* | 6/2017 | Spirer | H04N 21/475 |
| 2017/0277668 A1* | 9/2017 | Luo | G06F 16/345 |
| 2018/0159804 A1 | 6/2018 | Wei et al. | |
| 2018/0189269 A1* | 7/2018 | Quirk | G06F 40/289 |
| 2021/0209353 A1* | 7/2021 | Miller | G06K 9/6259 |

OTHER PUBLICATIONS

Moran, "Create a Hyperlink in Outlook and Word," YouTube, Jan. 14, 2013, 3 pp.
Shperber, "A gentle introduction to Doc2Vec," ScaleAbout, Jul. 26, 2017, 9 pp.
"Cosine similarity," Wikipedia, the Online Encyclopedia, accessed on Jul. 10, 2019, 6 pp.
"Word embedding," Wikipedia, the Online Encyclopedia, accessed Jul. 10, 2019, 4 pp.
"Word2vec," Wikipedia, the Online Encyclopedia, accessed Jul. 10, 2019, 6 pp.
Vaswani et al., "Attention Is All You Need," 31st Conference on Neural Information Processing Systems (NIPS 2017), Long Beach, California, USA, available on https://arxiv.org/pdf/1706.03762.pdf, Dec. 6, 2017, 11 pp.
Strope et al., "Efficient Smart Reply, now for Gmail," Google AI, accessed from https://ai.googleblog.com/2017/05/efficient-smart-reply-now-for-gmail.html, posted May 17, 2017, 4 pp.
Henderson et al., "Efficient Natural Language Response Suggestion for Smart Reply," available on https://arxiv.org/abs/1705.00652v1, May 1, 2017, 15 pp.
International Preliminary Reporton Patentability from counterpart Application No. PCT/US2019/022327 dated May 14, 2021, 9 pgs.
Response to Communication Pursuant to Rules 161(1) and 162 EPC dated May 12, 2021, from counterpart European Application No. 19714011.4, filed Nov. 10, 2021, 21 pp.

* cited by examiner

AUTOMATIC HYPERLINKING OF DOCUMENTS

BACKGROUND

A computing device may enable a user of the device to edit documents such as word processing documents, spreadsheets, and presentation slides, as well as electronic messages that may be sent to other users. The user may embed hyperlinks within the documents that link to other documents. A user that views a document that includes a hyperlink to another document may select the hyperlink to access the linked document.

SUMMARY

In general techniques of this disclosure are directed to predicting documents to be linked from a document as the document is being composed. An example computing system (such as an electronic messaging system) is described that is configured to provide suggested documents to be linked from a first document to a user that is composing the first document. For instance, the user may enter text into the first document to edit the first document. The computing system may, for each of one or more sequences of one or more words within the text entered by the user in the first document, determine whether the sequence of one or more words is a candidate for linking to a second document. If the computing system determines that a sequence of one or more words entered by the user is a candidate for linking to a second document, the computing system may determine one or more candidate documents to be linked from the sequence of one or more words. The user may select a second document of the one or more candidate documents to confirm that the second document is to be linked from the sequence of one or more words. In response to receiving the selection of the second document, the first document may be modified to link the second document from the sequence of one or more words.

The computing system may determine whether a sequence of one or more words entered by the user to edit the first document is a candidate for linking to a second document using one or more machine-learned models trained on a variety of training data. For example, the computing system may use a machine-learned classifier that may classify each sequence of one or more words entered by the user in the first document as being either a candidate for linking to a second document or not a candidate for linking to a second document. Similarly, the computing system may also determine one or more candidate documents to be linked from a sequence of one or more words within the first document using one or more machine learned models trained on a variety of training data to determine documents that are relevant to the sequence of one or more words. The one or more machine learned models may use the textual context surrounding the sequence of one or more words as well as context associated with the first document to determine the documents that are relevant to the sequence of one or more words. In this way, the computing system may increase the speed at which documents are linked from a document that is being edited.

The computing system may perform the techniques disclosed herein to determine whether a sequence of one or more words in a first document is a candidate for linking to a second document and to determine one or more candidate documents to be linked from the sequence of one or more words on-the-fly as the user edits the first document. In other words, as the user edits a first document, the computing system may analyze the text that has been entered in the first document to determine if any sequences of one or more words entered in the first document is classified as a candidate for linking to a second document and, if so, may determine one or more candidate documents to be linked from a sequence of one or more words that is classified as a candidate for linking to a second document.

The techniques disclosed herein may reduce the amount of interactions required in order to add links within documents that are being edited to link to external documents. Instead of processes that may require a user to highlight a sequence of one or more words within a first document in order to select the sequence of one or more words as anchor text that links to a second document, select a function to add a link, navigate through a file system or browse the web to find the second document that is to be linked from the highlighted word, and select the second document to be linked from the sequence of one or more words, the techniques disclosed herein enables the user to directly select a second document out of one or more candidate documents to link the selected second document from a sequence of one or more words of the first document.

In one aspect, the disclosure is directed to a method. The method includes determining, by the at least one processor using a machine-learned model, whether to classify a sequence of one or more words within a first document that is being edited as a candidate hyperlink based at least in part on the sequence of one or more words and context associated with the first document. The method further includes in response to classifying the sequence of one or more words as the candidate hyperlink, determining, by the at least one processor using the machine-learned model and based at least in part on the sequence of one or more words and the context, one or more candidate documents to be hyperlinked from the sequence of one or more words out of a plurality of documents. The method further includes in response to receiving an indication of a second document being selected out of the one or more candidate documents, modifying, by the at least one processor, the first document that is being edited to associate the sequence of one or more words with a hyperlink to the second document.

In another aspect, the disclosure is directed to a computing system. The system includes a memory configured to store a machine-learned model. The system further includes one or more processors configured to: determine, using the machine-learned model, whether to classify a sequence of one or more words within a first document that is being edited as a candidate hyperlink based at least in part on the sequence of one or more words and context associated with the first document, in response to classifying the sequence of one or more words as the candidate hyperlink, determine, using the machine-learned model and based at least in part on the sequence of one or more words and the context, one or more candidate document to be hyperlinked from the sequence of one or more words out of a plurality of documents, and in response to receiving an indication of a second document being selected out of the one or more candidate documents, modify the first document to associate the sequence of one or more words with a hyperlink to the second document.

In another aspect, the disclosure is directed to a computer-readable storage medium including instructions that, when executed by at least one processor, cause the at least one processor to: determine, using a machine-learned model, whether to classify a sequence of one or more words within a first document that is being edited as a candidate hyperlink based at least in part on the sequence of one or more words and context associated with the first document, in response to classifying the sequence of one or more words as the candidate hyperlink, determine, using the machine-learned model and based at least in part on the sequence of one or more words and the context, one or more candidate document to be hyperlinked from the sequence of one or more words out of a plurality of documents, and in response to receiving an indication of a second document being selected out of the one or more candidate documents, modify the first document to associate the sequence of one or more words with a hyperlink to the second document.

The details of one or more examples are set forth in the accompanying drawings and the description below. Other features, objects, and advantages will be apparent from the description and drawings, and from the claims.

DETAILED DESCRIPTION

Figure 1:
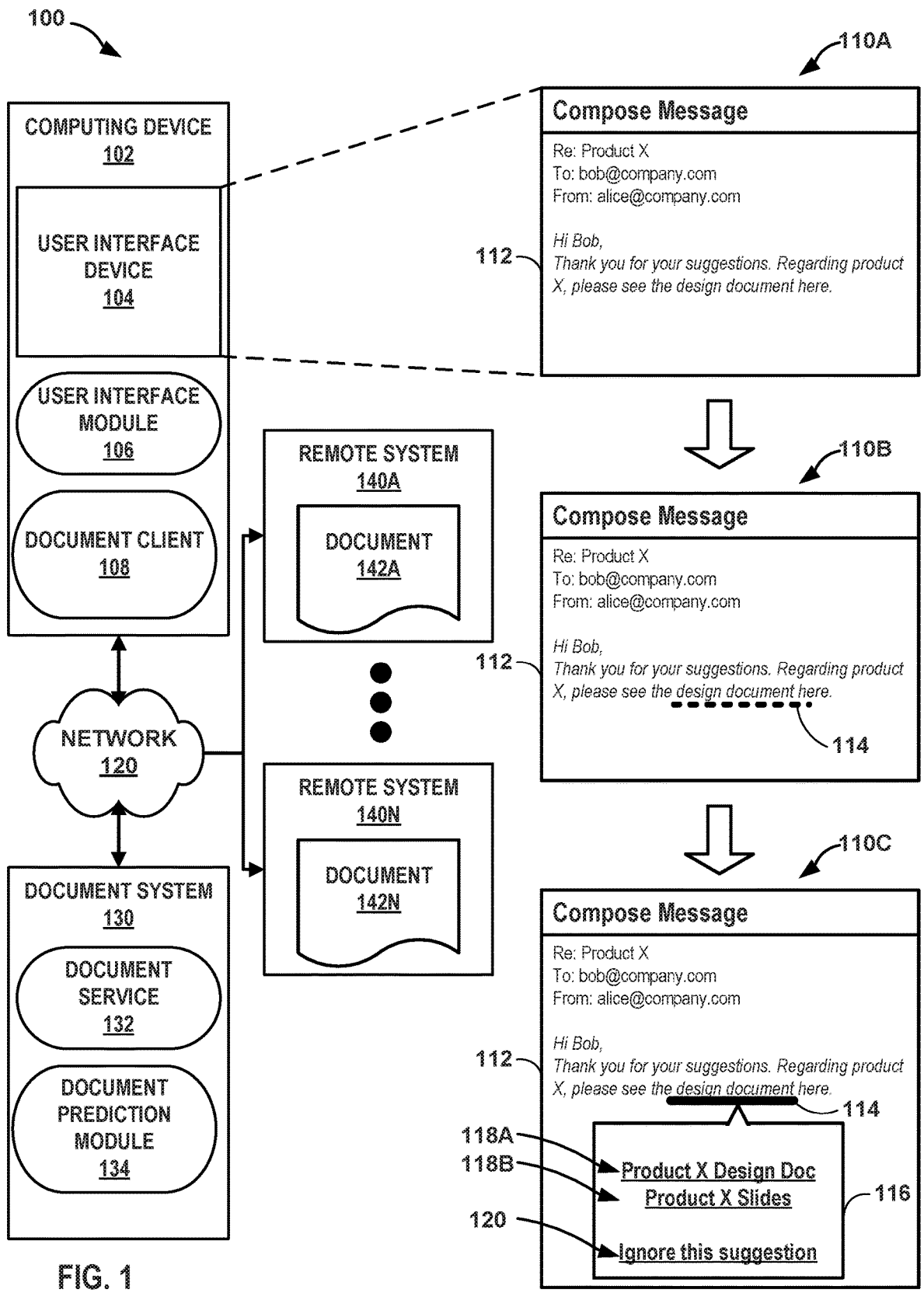
FIG. 1 is a conceptual diagram illustrating an example communications system for configured to suggest candidate documents to be linked from a document, in accordance with one or more techniques of the present disclosure.

FIG. 1 is a conceptual diagram illustrating an example communications system for configured to suggest candidate documents to be linked from a document, in accordance with one or more techniques of the present disclosure. As shown in FIG. 1, system 100 includes computing device 102, document system 130, and remote systems 140A-140N (hereafter "remote systems 140"). Computing device 102 may communicate with document system 130 via network 120 to compose and edit documents. Document system 130 may communicate with computing device 102 and remote systems 140 via network 120 to suggest candidate documents to be linked from documents on-the-fly as documents are being edited.

Examples of computing device 102 may include, but are not limited to, portable, mobile, or other devices, such as mobile phones (including smartphones), laptop computers, desktop computers, tablet computers, smart television platforms, personal digital assistants (PDAs), server computers, mainframes, and the like. For instance, in the example of FIG. 1, computing device 102 may be a wearable computing device, such as a smartwatch.

Computing device 102, as shown in the example of FIG. 1, includes user interface (UI) device 104. UI device 104 of computing device 102 may be configured to function as an input device and/or an output device for computing device 102. UI device 104 may be implemented using various technologies. For instance, UI device 104 may be configured to receive input from a user through tactile, audio, and/or video feedback. Examples of input devices include a presence-sensitive display, a presence-sensitive or touch-sensitive input device, a mouse, a keyboard, a voice responsive system, video camera, microphone or any other type of device for detecting a command from a user. In some examples, a presence-sensitive display includes a touch-sensitive or presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive technology. That is, UI device 104 of computing device 102 may include a presence-sensitive device that may receive tactile input from a user of computing device 102. UI device 104 may receive indications of the tactile input by detecting one or more gestures from the user (e.g., when the user touches or points to one or more locations of UI device 104 with a finger or a stylus pen).

UI device 104 may additionally or alternatively be configured to function as an output device by providing output to a user using tactile, audio, or video stimuli. Examples of output devices include a sound card, a video graphics adapter card, or any of one or more display devices, such as a liquid crystal display (LCD), dot matrix display, light emitting diode (LED) display, organic light-emitting diode (OLED) display, e-ink, or similar monochrome or color display capable of outputting visible information to a user of computing device 102. Additional examples of an output device include a speaker, a cathode ray tube (CRT) monitor, a liquid crystal display (LCD), or other device that can generate intelligible output to a user. For instance, UI device 104 may present output to a user of computing device 102 as a graphical user interface that may be associated with functionality provided by computing device 102. In this way, UI device 104 may present various user interfaces of applications executing at or accessible by computing device 102 (e.g., an electronic message application, an Internet browser application, etc.). A user of computing device 102 may interact with a respective user interface of an application to cause computing device 102 to perform operations relating to a function.

In some examples, UI device 104 of computing device 102 may detect two-dimensional and/or three-dimensional gestures as input from a user of computing device 102. For instance, a sensor of UI device 104 may detect the user's movement (e.g., moving a hand, an arm, a pen, a stylus) within a threshold distance of the sensor of UI device 104. UI device 104 may determine a two or three-dimensional vector representation of the movement and correlate the vector representation to a gesture input (e.g., a hand-wave, a pinch, a clap, a pen stroke) that has multiple dimensions. In other words, UI device 104 may, in some examples, detect a multi-dimension gesture without requiring the user to gesture at or near a screen or surface at which UI device 104 outputs information for display. Instead, UI device 104 may detect a multi-dimensional gesture performed at or near a sensor which may or may not be located near the screen or surface at which UI device 104 outputs information for display.

In the example of FIG. 1, computing device 102 includes user interface (UI) module 106 and document client module 108. UI module 106 and document client module 108 may perform one or more operations described herein using hardware, software, firmware, or a mixture thereof residing within and/or executing at computing device 102. Computing device 102 may execute UI module 106 and document client module 108 with one processor or with multiple processors. In some examples, computing device 102 may execute UI module 106 and document client module 108 as a virtual machine executing on underlying hardware. UI module 106 and document client module 108 may execute as one or more services of an operating system or computing platform or may execute as one or more executable programs at an application layer of a computing platform.

UI module 106, as shown in the example of FIG. 1, may be operable by computing device 102 to perform one or more functions, such as receive input and send indications of such input to other components associated with computing device 102, such as modules 10 and/or 12. UI module 106 may also receive data from components associated with computing device 102, such as document client module 108. Using the data received, UI module 106 may cause other components associated with computing device 102, such as UI device 104, to provide output based on the received data. For instance, UI module 106 may receive data from document client module 108 to display a GUI.

Remote systems 140 represent any suitable remote computing systems, such as one or more desktop computers, laptop computers, mainframes, servers, cloud computing systems, etc., that are configured to host documents 142A-142N (hereafter "documents 142"). For example, remote systems 140 may include web servers, document management systems, and the like that stores documents 142 that are accessible via network 120. Documents 142 may include any suitable documents that are accessible via network 120, such as web pages, word processing documents, spreadsheet documents, presentation documents, electronic messages, and any other network-accessible documents or resources.

Each document of documents 142 may be referenced using the document's location within network 120. For example, each document of documents 142 may be associated with a unique Uniform Resource Identifier (URI) or Uniform Resource Locator (URL) that specifies the document's location within network 120, and a document of documents 142 may be accessed via its URI or URL. Thus, a specific document of documents 142 may be referenced using the URI or URL associated with the document.

Document system 130 represents any suitable remote computing system, such as one or more desktop computers, laptop computers, mainframes, servers, cloud computing systems, etc., that is configured to perform actions on documents, such as creating, editing, or sharing documents such as documents 142. As discussed above, documents may include any suitable document such as web pages, word processing documents, spreadsheet documents, presentation documents, electronic messages, and the like. In some examples, document system 130 may host an electronic messaging service. For example, for processing electronic messages, document system 130 may include one or more mail servers configured to provide an e-mail messaging service.

Document system 130 may include document service module 132 and document prediction module 134. Document client module 108, as shown in the example of FIG. 1 (as "document client 108"), may include functionality to perform any variety of operations on computing device 102 to create or edit documents, or to perform any other suitable operations on documents. In some examples, to process electronic messages, document client module 108 may send and receive messages to and from remote computing devices via document system 130.

Document client module 108 may be any suitable application that includes functionality to create and edit documents, such as a word processing application, a spreadsheet application, a presentation creation application, a web browser, and the like. Document client module 108 may provide the front-end user facing features of a document service whereas document service module 132 supports the back-end operations needed to implement the document service on network 120. Document client module 108 may function as a portal from which computing device 102 accesses documents stored at document system 130, remote systems 140, and/or at computing device 102. Document client module 108 may provide an editing interface via which a user may compose and edit documents, as well as reply or forward documents, such as in the case where the documents are electronic messages. Composing new documents, editing documents, replying to electronic messages, and forwarding electronic messages may collectively be considered to be editing documents. Document client module 108 may be an e-mail application, web application, chat application, or other module executing at computing device 102 that communicates with document system 130 to provide a user of computing device 102 with access to documents maintained at document system 130, remote systems 140, and/or computing device 102.

Document client module 108 may provide an editing interface via which a user may compose and edit documents, as discussed above. As shown in FIG. 1, document 112 may be an email message that is being edited. While document 112 is illustrated in FIG. 1 as an e-mail message, the techniques described herein with respect to document 112 may equally be applied to any other suitable types of document, such as word processing documents, spreadsheets, presentation documents, and the like. To enable editing of document 112, document client module 108 may send data to cause UI device 104 to output user interface 110A via UI device 104. Document client module 108 may interact with one or more other components of system 100 to assist a user with composing or editing document 112. As shown in user interface 110A, the user has entered the following text into the body of document 112: "Hi Bob, Thank you for your suggestions. Regarding product X, please see the design document here."

Document client module 108 may interact with document prediction module 134 to automatically suggest that a sequence of one or more words within the body of document 112 be linked to a document, and may automatically suggest one or more candidate documents to be linked from the sequence of one or more words. Document prediction module 134 may make these suggestions as document 112 is being composed or edited. By linking to a document, document 112 itself does not include the document. In other words, the linked document is not attached to or otherwise embedded within document 112. Instead, document 112 includes a reference to the location of the linked document within network 120, such as a hyperlink to the document. When the recipient of document 112 views the body of document 112, the recipient may select the hyperlink to the linked document in order to access and the document linked from document 112.

In accordance with one or more techniques of this disclosure, document prediction module 134 may determine, using a machine-learned model, whether to classify a sequence of one or more words within document 112 that is being edited by the user as a candidate hyperlink based at least in part on the sequence of one or more words and context associated with document 112. A candidate hyperlink may be a sequence of one or more words for which document prediction module 134 may determine one or more candidate documents to be linked from the sequence of one or more words. As such, document prediction module 134 may determine one or more candidate documents to be linked from a sequence of one or more words only when document prediction module 134 classifies the sequence of one or more words as a candidate hyperlink, and may refrain from determining one or more candidate documents to be linked from a sequence of one or more words when document prediction module 134 does not classify the sequence of one or more words as a candidate hyperlink. Document prediction module 134 may comprise one or more machine-learned models. For example, document prediction module 134 may include a link-detection module that is a machine-learned model for classifying sequences of one or more words as candidate hyperlinks, and may also include a document retrieval module that is a machine-learned model for determining one or more candidate documents to be linked from each of the candidate hyperlinks.

In the example of FIG. 1, document prediction module 134 may process each sequence of one or more words input into the body of document 112 to classify the sequence of one or more words as either being a candidate hyperlink or not being a candidate hyperlink. Document prediction module 134 may perform the classification for a sequence of one or more words based at least in part on the sequence of one or more words and context associated with document 112. Context associated with the message may include the textual contents of document 112, the sender, recipient, and/or subject of document 112, previous messages in the thread of messages that include document 112, activity associated with document 112 such as previous user interactions with document 112 and the associated timestamps of such user interactions, the recency in which document 112 was last edited, or any other features of document 112. Context associated with document 112 may also include textual context associated with the sequence of one or more words. The textual context associated with the sequence of one or more words may be one or more words within document 112 that provides semantic context to the particular sequence of one or more words, and may include one or more words that surround the particular sequence of one or more words within document 112, are adjacent to the particular sequence of one or more words within document 112, and/or any other words within the body of document 112 that provides context to the sequence of one or more words.

In the example of FIG. 1, document prediction module 134 may determine whether to classify the sequence of one or more words "design document" in document 112 as being a candidate hyperlink based at least in part on the sequence of one or more words "design document" and context associated with document 112, such as the textual context associated with the sequence of one or more words "design document". The textual context associated with the sequence of one or more words "design document" may be the remaining words in the body of document 112, which may include the sequence of one or more words in the sentence "Regarding product X, please see the design document here." As can be seen, the textual context associated with the sequence of one or more words "design document" that refers to "product X" may provide an indication of the document, such as a design document for product X, that is to be linked from "design document".

In response to classifying the sequence of one or more words as the candidate hyperlink, document prediction module 134 may use a machine-learned model to determine one or more candidate document to be hyperlinked from the sequence of one or more words in document 112 out of a plurality of documents 142 based at least in part on the sequence of one or more words and the context associated with document 112. Document prediction module 134 may make such a determination while document 112 is being edited or otherwise generated by a user via document client module 108 of computing device 102. In the example of FIG. 1, in response to classifying the sequence of one or more words "design document" as a candidate hyperlink, document prediction module 134 may determine one or more candidate documents to be linked from the sequence of one or more words "design document" out of a plurality of documents 142.

In response to document prediction module 134 determining one or more candidate documents to be linked from a sequence of one or more words classified as a candidate hyperlink within document 112, document service module 132 may send to document client module 108 an indication of the sequence of one or more words classified as a candidate hyperlink within document 112 as well as an indication of the one or more candidate documents. In response to receiving the indication of the sequence of one or more words that is classified as a candidate hyperlink and the indication of the one or more candidate documents, document client module 108 may cause UI device 104 to output an indication that the sequence of one or more words in document 112 is classified as a candidate hyperlink.

As shown in FIG. 1, document client module 108 may send data to UI module 106 to cause UI device 104 to output user interface 110B that includes a visual indication that the sequence of one or more words "design document" is classified as a candidate hyperlink. For example, document client module 108 may cause UI device to visually emphasize the sequence of one or more words "design document," such as by including a dotted underline underneath the sequence of one or more words "design document" in user interface 110B.

The sequence of one or more words "design document" in user interface 110B may be a selectable UI element 114 that the user may select to view indications of one or more candidate documents that may be linked from the sequence of one or more words "design document." For example, the user of computing device 102 that is editing document 112 may select UI element 114 in user interface 110B by providing input, such as touch or haptic input, voice input or other audio input, or any other form of input, at UI device 104. UI device 104 may detect the input and send an indication of the input to UI module 106. UI module 106 may provide data to document client module 108 based on the received indication of the input, and document client module 108 may determine that the input corresponds to a selection of UI element 114.

As shown in FIG. 1, in response to receiving input that corresponds to a selection of UI element 114, document client module 108 may send data to UI module 106 that causes UI device 104 to output user interface 110C, which may include an indication of the one or more candidate documents to be linked from the sequence of one or more words "design document". For example, user interface 110C includes menu 116 that includes menu items 118A and 118B associated with candidate document "Product X Design Doc" and candidate document "Product X Slides," respectively. "Product X Design Doc" may be a word processor document while "Product X Slides" may be a presentation document (e.g., slides). Menu 116 may also include menu item 120 that may be selected to reject the suggested candidate documents. In some examples, menu 116 may provide the option to receive input of an URL of a document to be linked from the sequence of one or more words instead of the determined candidate documents.

The user of computing device 102 that is editing document 112 may provide input at UI device 104 to select one of menu item 118A, menu item 118B, or menu item 120. UI device 104 may detect the input and may send an indication of the input to UI module 106. UI module 106 may provide data to document client module 108 based on the received indication of input, and document client module 108 may determine, based on the data received from UI module 106, whether the input corresponds to a selection of menu item 118A, menu item 118B, or menu item 120.

If the input received by UI device 104 corresponds to a selection of menu item 118A associated with the candidate document "Product X Design Doc" or menu item 118B associated with the candidate document "Product X Slides," document client module 108 may send an indication that the sequence of one or more words "design document" is to be associated with a hyperlink to the selected candidate document (e.g., one of candidate document "Product X Design Doc" or candidate document "Product X Slides") to document service module 132. If the input received by UI device 104 corresponds to a selection of menu item 120, document client module 108 may send to document service module 132 an indication that the sequence of one or more words "design document" is not a hyperlink and is not to be linked to any of the candidate documents determined by document prediction module 134.

In response to receiving an indication of a document being selected out of the one or more candidate documents to be linked from a word classified as a candidate hyperlink, document service module 132 may modify document 112 to associate the sequence of one or more words that was classified as a candidate hyperlink with a hyperlink to the selected document. For example, document service module 132 may receive, from document client module 108, an indication of the document that was selected (i.e., one of candidate document "Product X Design Doc" or candidate document "Product X Slides") out of the candidate documents to be linked from the sequence of one or more words "design document," as well as an indication of the sequence of one or more words "design document" that was classified as a candidate hyperlink. In response, document service module 132 may modify document 112 so that the sequence of one or more words "design document" in document 112 is associated with a hyperlink to the selected document.

Document service module 132 may modify document 112 to associate a word within document 112 with a hyperlink to a document in any suitable fashion. As discussed above, a document to be linked from document 112 may be associated with a URI or URL that uniquely identifies the document's location in network 120. Thus, document service module 132 may modify document 112 to insert computer code, such as HyperText Markup Language (HTML) code that specifies a particular sequence of one or more words as anchor text that references the URL identifying the location of the document within network 120 that is to be associated with the particular sequence of one or more words. In the example of FIG. 1, document service module 132 may modify document 112 by inserting computer code into document 112 that specifies the sequence of one or more words "design document" as anchor text that is associated with the URL identifying the location of the document "Product X Design Doc" to thereby link the document from the sequence of one or more words "design document" in document 112, and to thereby associate the sequence of one or more words "design document" with a hyperlink to the document "Product X Design Doc". Document service module 132 may send to the recipient document 112 that includes the hyperlink to the document.

The techniques disclosed herein may promote more efficient user interactions with the example system. By determining whether sequences of one or more words within a document are classified as candidate hyperlinks and by determining one or more candidate documents for each sequence of one or more words within the document that are classified as candidate hyperlinks, the techniques disclosed herein may reduce the amount of user interactions required in order to add links to documents within documents compared with other computing systems that do not determine whether sequences of one or more words within a document are classified as candidate hyperlinks and do not determine determining one or more candidate documents for each sequence of one or more words within the document that are classified as candidate hyperlinks. By reducing the amount of user interactions required in order to add links to documents within electronic messages, system resources of the example computing system can be saved, and example computing system may provide a less frustrating and more enjoyable user experience.

Throughout the disclosure, examples are described wherein a computing device and/or computing system may analyze information (e.g., e-mail, other communications, and the like) associated with the user of the computing device only if the computing device and/or the computing system receives explicit permission from the user of the computing device to analyze the information. For example, in situations discussed below in which the computing device and/or computing system may collect or may make use of communication information associated with the user and the computing device, the user may be provided with an opportunity to provide input to control whether programs or features of the computing device and/or computing system can collect and make use of user information (e.g., information about a user's e-mail, a user's social network, social actions or activities, profession, a user's preferences, or a user's past and current location), or to dictate whether and/or how the computing device and/or computing system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or computing system.

Figure 2:
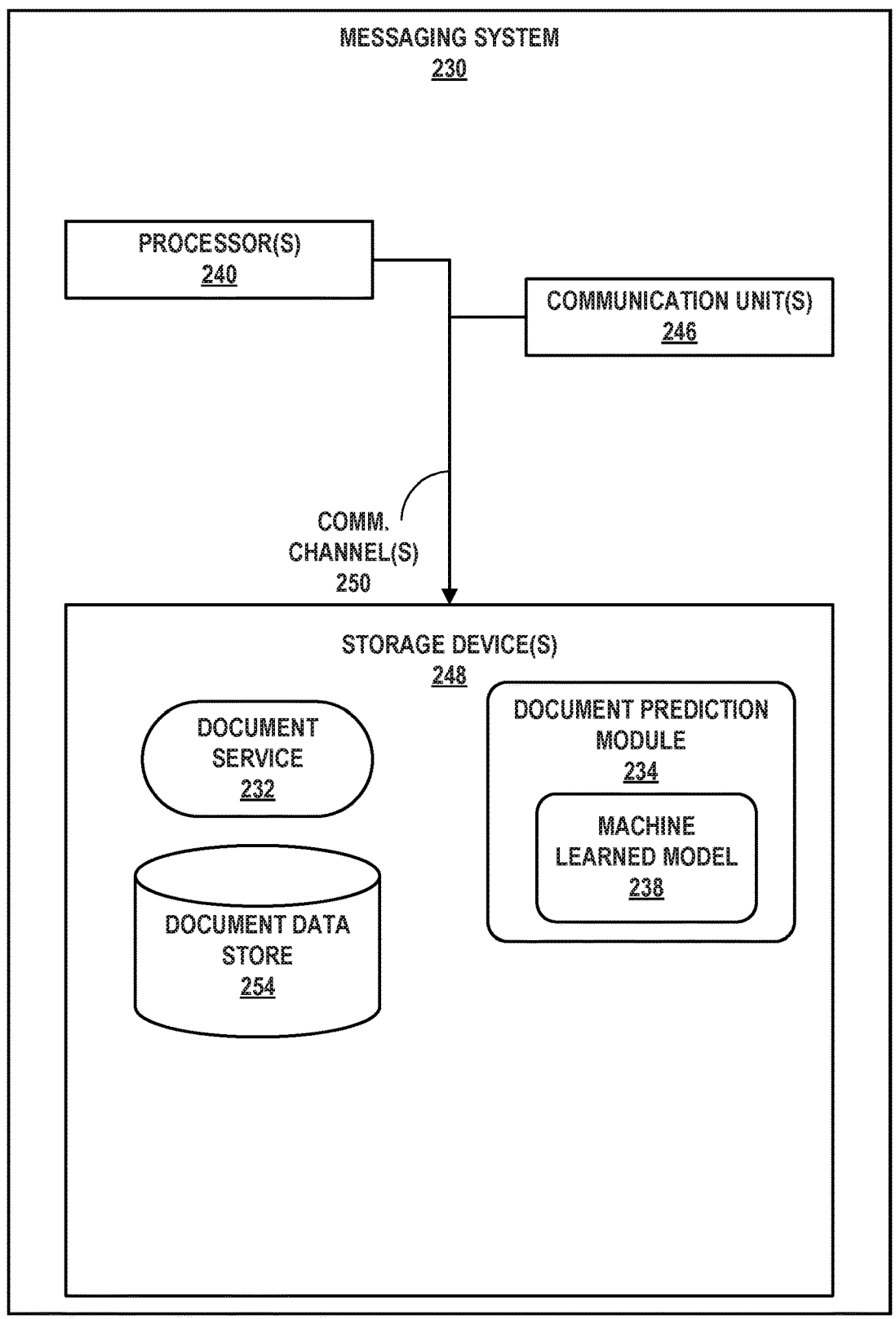
FIG. 2 is a block diagram illustrating details of one example of a computing system that may be configured to provide candidate documents to be linked from a document, in accordance with one or more techniques of the present disclosure.

FIG. 2 is a block diagram illustrating an example computing system that is configured to selectively provide predicted document suggestions to a user editing a document, in accordance with one or more aspects of the present disclosure. Document system 230 of FIG. 2 is described below as an example of document system 130 of FIG. 1. FIG. 2 illustrates only one particular example of document system 230, and many other examples of document system 230 may be used in other instances and may include a subset of the components included in document system 230 or may include additional components not shown in FIG. 2.

As shown in the example of FIG. 2, document system 230 include one or more processors 240, one or more communication units 246, and one or more storage components 248. Storage components 248 of document system 230 includes document service module 232, document prediction module 234, and document data store 254. Document prediction module 234 includes machine-learned model 238.

Communication channels 250 interconnect each of the components 240, 246, and 248 for inter-component communications (physically, communicatively, and/or operatively). In some examples, communication channels 250 may include a system bus, a network connection, an inter-process communication data structure, or any other method for communicating data.

One or more communication units 246 communicate with external devices via one or more wired and/or wireless networks by transmitting and/or receiving network signals on the one or more networks. Examples of communication units 246 include a network interface card (e.g. such as an Ethernet card), an optical transceiver, a radio frequency transceiver, a GPS receiver, or any other type of device that can send and/or receive information. Other examples of communication units 246 may include short wave radios, cellular data radios, wireless network radios, as well as universal serial bus (USB) controllers.

One or more storage components 248 store information for processing during operation of document system 230. In some examples, storage components 248 is a temporary memory, meaning that a primary purpose of storage components 248 is not long-term storage. Storage components 248 on document system 230 may be configured for short-term storage of information as volatile memory and therefore not retain stored contents if powered off. Examples of volatile memories include random access memories (RAM), dynamic random-access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with document service module 232, document prediction module 234, machine-learned model 238, and document data store 254.

One or more processors 240 may implement functionality and/or execute instructions associated with document system 230. Examples of processors 240 include application processors, display controllers, auxiliary processors, one or more sensor hubs, and any other hardware configure to function as a processor, a processing unit, or a processing device. Document service module 232, document prediction module 234, and machine-learned model 238 may include instructions that are operable by processors 240 to perform various actions, operations, or functions of document system 230. For example, processors 240 may retrieve and execute instructions stored by storage components 248 that cause processors 240 to perform the operations described herein that are attributed to document service module 232, document prediction module 234, and machine-learned model 238. The instructions, when executed by processors 240, may cause document system 230 to store information within storage components 248, for example, at document data store 254.

While displayed as part of a single device in the example of FIG. 2, components of document system 230 may, in some examples, be located within and/or part of different devices. For instance, in some examples, some or all of the functionality of document service module 232, document prediction module 234, and machine-learned model 238 may be located at the same or different computing systems. That is, in some examples, techniques of the present disclosure may be performed and utilized by a single computing device, while in other examples, the techniques may be performed and/or utilized across a plurality of computing systems, such as a distributed or "cloud" computing system.

Document service module 232 may include all functionality of document service module 132 of FIG. 1 and may perform similar operations as document service module 132 so as to configure document system 230 to provide a network-based document service. Document service module 232 may process documents received via a network, such as network 120. Document service module 232 may also maintain a document account that is associated with a user of computing device 102. Document service module 232 may store data associated with the document account in document data store 254.

In the case where documents include electronic messages, document data store 254 may maintain an inbox for the document account to store messages received by document service module 262 that are addressed to the document account associated with the user. Document data store 254 may also maintain a sent box for the document account to store messages sent from the document account associated with the user. In some examples, data associated with the document account may be replicated and stored locally at other computing devices, such as computing device 102. That is, for any action that document service module 232 performs on a document account, document service module 232 may cause a client (such as document client module 108) to perform a similar action to a copy of the document account that is stored elsewhere, and remote from document system 230.

Document prediction module 234 may include all functionality of document prediction module 134 of FIG. 1 and may perform similar operations as document prediction module 134. As discussed above and in accordance with one or more techniques of this disclosure, document prediction module 234 may automatically determine whether a sequence of one or more words in the body of a document is classified as a candidate hyperlink as well as one or more candidate documents to be linked from each sequence of one or more words in the body of the document that has been classified as a candidate hyperlink. Although shown and described as being part of document system 230, which is a remote system, some or all portions of document prediction module 234 may reside locally at, and be executable from, a computing device, such as computing device 102 of FIG. 1, or may reside at and be executable from another computing system, such as at another remote system, such as one of remote systems 140 of FIG. 1.

Document prediction module 234 may use machine learned (ML) model 238 to determine the one or more candidate hyperlinks within the body of a document as well as to determine the one or more candidate documents to be linked from candidate hyperlinks within portions of texts of documents. ML model 238 may be any suitable machine-learned model, such as a neural network, a long-short-term memory model, and the like, and may develop rules or otherwise learn relationships between portions of texts in documents and other documents, in order to determine one or more candidate documents that are linked from a candidate hyperlink within a portion of text of the body of a document.

To determine that one or more sequences of one or more words within the body of a document are candidate hyperlinks, document prediction module 234 may performing one or more of the following techniques: pre-triggering and post-triggering. Pre-triggering may include document prediction module 234 performing link detection by identifying words and phrases within the body of the document that are potential document mentions. For example, phrases such as "this document," "the presentation," "this postmortem," and the like that mention or reference a document are likely to be document mentions. Document prediction module 234 may analyze a corpus of documents that may include document mentions to determine words and phrases that are likely to be potential document mentions. Document prediction module 234 may store a set of phrases that are potential document mentions, such as in document data store 254. Document prediction module 234 may apply link detection when determining whether a sequence of one or more words in a document is a candidate hyperlink by determining whether the sequence of one or more words or the textual context associated with the sequence of one or more words includes one of the sequence of one or more words or phrases identified as potential document mentions.

Document prediction module 234 may perform pre-triggering using ML model 238 to determine whether to classify a sequence of one or more words in the body of a document as a candidate hyperlink. ML model 238 may act as a classifier to classify a sequence of one or more words within the body of the document as either being a candidate hyperlink or not being a candidate hyperlink. For example, ML model 238 may classify the sequence of one or more words "postmortem" as a candidate hyperlink in the phrase "design document is the postmortem for last week's outage," but an unlikely candidate hyperlink in the phrase "Could you please write a postmortem for last week's outage?"

Document prediction module 234 may perform post-triggering using ML model 238 to determine whether a sequence of one or more words in the body of a document is a candidate hyperlink based on whether a document referenced by the sequence of one or more words or its associated textual context is actually included in the one or more candidate documents determined by ML model 238. In other words, document prediction module 234 determines whether the document is a good match with the sequence of one or more words. If the document is not a good match with the sequence of one or more words, document prediction module 234 may refrain from determining candidate documents to be linked from the sequence of one or more words. Post-triggering may be useful in situations where the referenced document is not one of the plurality of documents from which the one or more candidate documents are determined. For example, if document prediction module 234 determines candidate documents out of the ten most recently opened documents by the user, and if the referenced document is not one of the ten most recently opened documents by the user, then document prediction module 234 may perform post-triggering to determine that the referenced document is not one of the candidate documents.

To determine one or more candidate document that are linked from a sequence of one or more words that is a candidate hyperlink, ML model 238 may receive as input an indication of the sequence of one or more words and an indication of the textual context for the sequence of one or more words and, in response, may determine a query vector based at least in part on the sequence of one or more words and the textual context. The query vector may be generated based at least in part on adding one or more layers on to word embeddings for word and textual context that captures the semantic meaning of the sequence of one or more words and context associated with the document that includes the sequence of one or more words. Similarly, ML model 238 may also receive as input indications of a plurality of documents that are considered by document prediction module 234 when determining the one or more candidate documents to be linked from the sequence of one or more words, and may determine a document vector for each of the plurality of documents. Each document vector may also be generated based at least in part on adding one or more layers to word embeddings for the associated document, such that a document vector captures at least the semantic meaning of the content of the associated document as well as other features associated with the document. Word embeddings may be a multi-dimensional real-valued vector that captures the semantic meaning of the associated word or the associated document.

To determine the likelihood of each of the plurality of documents to be linked from the sequence of one or more words that is a candidate hyperlink, ML model 238 may perform a dot product of the query vector with each of the plurality of document vectors. ML model 238 may determine a plurality of dot product scores resulting from performing a dot product of the query vector with each of the plurality of document vectors. Each dot product score of the plurality of dot product scores may result from performing a dot product of the query vector with one of the document vectors, and may be a semantic match score that represents a quality of the match between the sequence of one or more words and its context represented by the query vector and the document represented by the document vector. Throughout this disclosure, a dot product score associated with a document may refer to the dot product score resulting from performing a dot product of a query vector with a document vector that is determined by ML model 238 from the document. The dot product score may be a semantic match score for the semantic similarity between the sequence of one or more words and textual context represented by the query vector and the document represented by the document vector. By representing text and documents as respective query vectors and document vectors, and by performing the dot product of query vectors and document vectors, the techniques disclosed herein improves the performance of determining candidate documents for a candidate hyperlink compared with other techniques for determining candidate documents for a candidate hyperlink.

Document prediction module 234 may determine the one or more candidate documents to be linked from the candidate hyperlink based at least in part on the plurality of dot product scores resulting from performing a dot product of the query vector with each one of the plurality of document vectors. The dot product score resulting from performing a dot product of the query vector with a document vector associated with a document may correspond to the relative likelihood that the document associated with the document vector is one of the one or more candidate documents to be linked from the sequence of one or more words. Thus, a document associated with a relatively higher dot product score may be more likely to be one of the one or more candidate documents to be linked from the sequence of one or more words compared with another document associated with a relatively lower score.

Document prediction module 234 may determine the one or more candidate documents to be linked from the sequence of one or more words based at least in part on the plurality of dot product scores resulting from performing a dot product of the query vector with each one of the plurality of document vectors in a variety of ways. For example, document prediction module 234 may set a threshold dot product score so that only the documents having associated dot product scores that are above the threshold dot product score are included in the one or more candidate documents. In another example, document prediction module 234 may compute a softmax value over the N highest dot product scores to compute a confidence score for each of the associated documents, and may determine that documents having the highest confidence scores are the candidate documents to be linked from the sequence of one or more words.

In another example, document prediction module 234 may limit the number of documents included in the one or more candidate documents to a maximum N documents, where N may be any suitable number such as 3, 4, 5, and the like. For example, document prediction module 234 may select the documents associated with the top N dot product scores as the one or more candidate documents, or may select the documents associated with the top N dot product scores that are greater than the threshold dot product score as the one or more candidate documents.

Document prediction module 234 may also limit the number of documents from which one or more candidate documents are determined. Document prediction module 234 may only consider documents that are accessible by the intended recipient or viewer of the document, and may refrain from considering documents not accessible by the intended recipient or viewer. Further, in some examples, document prediction module 234 may limit the documents that are considered to ones that have been created, edited, viewed, or otherwise accessed by the user that is editing the document.

Document prediction module 234 may also limit the documents that are considered when determining one or more candidate documents to be linked from a candidate hyperlink within a document based on how recently the user last accessed or edited the documents. For example, document prediction module 234 may determine one or more candidate documents from N most recently accessed or edited documents, where N may be any suitable integer such as 10, 50, 100, and the like. In another example, document prediction module 234 may determine one or more candidate documents from documents that have been accessed or edited by the user within a specified time period, such as the last day, the last week, and the like, or may determine the one or more candidate documents based on the recency of when the documents were last accessed or edited. In some examples, ML model 238 may take these factors as input in order to compute document vectors for documents based on these factors along with the semantic content of the documents.

Document prediction module 234 may use ML model 238 to proactively compute document vectors for documents that may be considered when the user edits or accesses the documents. In other words, document prediction module 234 may determine document vectors for documents prior to encountering a document that is being edited by the user for which document prediction module 234 determines one or more candidate documents to be linked from the document. Document prediction module 234 may store such pre-computed document vectors in document data store 254, or may store such pre-computed document vectors outside of document system 230, such as at computing device 102 or remote system 140 shown in FIG. 1.

In response to classifying a sequence of one or more words within the body of a document that is being edited as being a candidate hyperlink and in response to determining one or more candidate documents to be linked from the sequence of one or more words that has been classified as being a candidate hyperlink, document prediction module 234 may communicate with document service module 232 to send an indication of the sequence of one or more words classified as being a candidate hyperlink and indications of the one or more candidate documents to the document client (e.g., document client module 108 shown in FIG. 1) with which the user interacts to edit the document. In response, document service module 232 may either receive 1) an indication that the user has ignored the selection or 2) an indication of a document that has been selected out of the one or more candidate documents.

If document service module 232 receives an indication that the user is ignoring the selection, document service module 232 may refrain from modifying the document to link the sequence of one or more words classified as being a candidate hyperlink to one of the one or more candidate documents. Alternatively, if document service module 232 receives an indication of a document that has been selected out of the one or more candidate documents, document service module 232 may modify the document that is being edited so that the sequence of one or more words classified as being a candidate hyperlink hyperlinks to the selected document out of the one or more candidate documents. For example, document service module 232 may insert computer code, such as HTML code, in the message that specifies the sequence of one or more words as anchor text that hyperlinks to the location of the document within a network (e.g., network 120 of FIG. 1).

Document prediction module 134 may continue to determine whether any additional sequences of one or more words within the document being edited are classified as candidate hyperlinks and to identify candidate documents for any of the additional sequences of one or more words that are classified as candidate hyperlinks. In response to receiving a command to send the document, document service module 132 may operate to send, to the recipient specified by the document, the document that includes one or more hyperlinks to a respective one or more documents.

FIGS. 3A through 3E are conceptual diagrams illustrating aspects of an example machine-learned model according to example implementations of the present disclosure. FIGS. 3A through 3E are described below in the context of machine-learned model 238 of FIG. 2. For example, in some instances, machine-learned model 300, as referenced below, is an example of machine-learned model 238 of FIG. 2.

Figure 3A:
FIGS. 3A-3E are conceptual diagrams illustrating aspects of an example machine-learned model according to example implementations of the present disclosure.

FIG. 3A depicts a conceptual diagram of an example machine-learned model according to example implementations of the present disclosure. As illustrated in FIG. 3A, in some implementations, machine-learned model 300 is trained to receive input data of one or more types and, in response, provide output data of one or more types. Thus, FIG. 3A illustrates machine-learned model 300 performing inference.

The input data may include one or more features that are associated with an instance or an example. In some implementations, the one or more features associated with the instance or example can be organized into a feature vector. In some implementations, the output data can include one or more predictions. Predictions can also be referred to as inferences. Thus, given features associated with a particular instance, machine-learned model 300 can output a prediction for such instance based on the features.

Machine-learned model 300 can be or include one or more of various different types of machine-learned models. In particular, in some implementations, machine-learned model 300 can perform classification, regression, clustering, anomaly detection, recommendation generation, and/or other tasks.

In some implementations, machine-learned model 300 can perform various types of classification based on the input data. For example, machine-learned model 300 can perform binary classification or multiclass classification. In binary classification, the output data can include a classification of the input data into one of two different classes. In multiclass classification, the output data can include a classification of the input data into one (or more) of more than two classes. The classifications can be single label or multi-label. Machine-learned model 300 may perform discrete categorical classification in which the input data is simply classified into one or more classes or categories.

In some implementations, machine-learned model 300 can perform classification in which machine-learned model 300 provides, for each of one or more classes, a numerical value descriptive of a degree to which it is believed that the input data should be classified into the corresponding class. In some instances, the numerical values provided by machine-learned model 300 can be referred to as "confidence scores" that are indicative of a respective confidence associated with classification of the input into the respective class. In some implementations, the confidence scores can be compared to one or more thresholds to render a discrete categorical prediction. In some implementations, only a certain number of classes (e.g., one) with the relatively largest confidence scores can be selected to render a discrete categorical prediction.

Machine-learned model 300 may output a probabilistic classification. For example, machine-learned model 300 may predict, given a sample input, a probability distribution over a set of classes. Thus, rather than outputting only the most likely class to which the sample input should belong, machine-learned model 300 can output, for each class, a probability that the sample input belongs to such class. In some implementations, the probability distribution over all possible classes can sum to one. In some implementations, a Softmax function, or other type of function or layer can be used to squash a set of real values respectively associated with the possible classes to a set of real values in the range (0, 1) that sum to one.

In some examples, the probabilities provided by the probability distribution can be compared to one or more thresholds to render a discrete categorical prediction. In some implementations, only a certain number of classes (e.g., one) with the relatively largest predicted probability can be selected to render a discrete categorical prediction.

In cases in which machine-learned model 300 performs classification, machine-learned model 300 may be trained using supervised learning techniques. For example, machine-learned model 300 may be trained on a training dataset that includes training examples labeled as belonging (or not belonging) to one or more classes. Further details regarding supervised training techniques are provided below in the descriptions of FIGS. 3B through 3E.

In some implementations, machine-learned model 300 can perform regression to provide output data in the form of a continuous numeric value. The continuous numeric value can correspond to any number of different metrics or numeric representations, including, for example, currency values, scores, or other numeric representations. As examples, machine-learned model 300 can perform linear regression, polynomial regression, or nonlinear regression. As examples, machine-learned model 300 can perform simple regression or multiple regression. As described above, in some implementations, a Softmax function or other function or layer can be used to squash a set of real values respectively associated with a two or more possible classes to a set of real values in the range (0, 1) that sum to one.

Machine-learned model 300 may perform various types of clustering. For example, machine-learned model 300 can identify one or more previously-defined clusters to which the input data most likely corresponds. Machine-learned model 300 may identify one or more clusters within the input data. That is, in instances in which the input data includes multiple objects, documents, or other entities, machine-learned model 300 can sort the multiple entities included in the input data into a number of clusters. In some implementations in which machine-learned model 300 performs clustering, machine-learned model 300 can be trained using unsupervised learning techniques.

Machine-learned model 300 may perform anomaly detection or outlier detection. For example, machine-learned model 300 can identify input data that does not conform to an expected pattern or other characteristic (e.g., as previously observed from previous input data). As examples, the anomaly detection can be used for fraud detection or system failure detection.

In some implementations, machine-learned model 300 can provide output data in the form of one or more recommendations. For example, machine-learned model 300 can be included in a recommendation system or engine. As an example, given input data that describes previous outcomes for certain entities (e.g., a score, ranking, or rating indicative of an amount of success or enjoyment), machine-learned model 300 can output a suggestion or recommendation of one or more additional entities that, based on the previous outcomes, are expected to have a desired outcome (e.g., elicit a score, ranking, or rating indicative of success or enjoyment). As one example, given input data descriptive of a context of a computing device, such as computing device 102 of FIG. 1, a recommendation system, such as document system 130 of FIG. 1 and document system 230 of FIG. 2, can output a suggestion or recommendation of one or more candidate documents to be linked from a word in a document.

Machine-learned model 300 may, in some cases, act as an agent within an environment. For example, machine-learned model 300 can be trained using reinforcement learning, which will be discussed in further detail below.

In some implementations, machine-learned model 300 can be a parametric model while, in other implementations, machine-learned model 300 can be a non-parametric model. In some implementations, machine-learned model 300 can be a linear model while, in other implementations, machine-learned model 300 can be a non-linear model.

As described above, machine-learned model 300 can be or include one or more of various different types of machine-learned models. Examples of such different types of machine-learned models are provided below for illustration. One or more of the example models described below can be used (e.g., combined) to provide the output data in response to the input data. Additional models beyond the example models provided below can be used as well.

In some implementations, machine-learned model 300 can be or include one or more classifier models such as, for example, linear classification models; quadratic classification models; etc. Machine-learned model 300 may be or include one or more regression models such as, for example, simple linear regression models; multiple linear regression models; logistic regression models; stepwise regression models; multivariate adaptive regression splines; locally estimated scatterplot smoothing models; etc.

In some examples, machine-learned model 300 can be or include one or more decision tree-based models such as, for example, classification and/or regression trees; iterative dichotomiser 3 decision trees; C4.5 decision trees; chi-squared automatic interaction detection decision trees; decision stumps; conditional decision trees; etc.

Machine-learned model 300 may be or include one or more kernel machines. In some implementations, machine-learned model 300 can be or include one or more support vector machines. Machine-learned model 300 may be or include one or more instance-based learning models such as, for example, learning vector quantization models; self-organizing map models; locally weighted learning models; etc. In some implementations, machine-learned model 300 can be or include one or more nearest neighbor models such as, for example, k-nearest neighbor classifications models; k-nearest neighbors regression models; etc. Machine-learned model 300 can be or include one or more Bayesian models such as, for example, naïve Bayes models; Gaussian naïve Bayes models; multinomial naïve Bayes models; averaged one-dependence estimators; Bayesian networks; Bayesian belief networks; hidden Markov models; etc.

In some implementations, machine-learned model 300 can be or include one or more artificial neural networks (also referred to simply as neural networks). A neural network can include a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

Machine-learned model 300 can be or include one or more feed forward neural networks. In feed forward networks, the connections between nodes do not form a cycle. For example, each connection can connect a node from an earlier layer to a node from a later layer.

In some instances, machine-learned model 300 can be or include one or more recurrent neural networks. In some instances, at least some of the nodes of a recurrent neural network can form a cycle. Recurrent neural networks can be especially useful for processing input data that is sequential in nature. In particular, in some instances, a recurrent neural network can pass or retain information from a previous portion of the input data sequence to a subsequent portion of the input data sequence through the use of recurrent or directed cyclical node connections.

In some examples, sequential input data can include time-series data (e.g., sensor data versus time or imagery captured at different times). For example, a recurrent neural network can analyze sensor data versus time to detect or predict a swipe direction, to perform handwriting recognition, etc. Sequential input data may include words in a sentence (e.g., for natural language processing, speech detection or processing, etc.); notes in a musical composition; sequential actions taken by a user (e.g., to detect or predict sequential application usage); sequential object states; etc.

Example recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc.

In some examples, machine-learned model 300 can be or include one or more non-recurrent sequence-to-sequence models based on self-attention, such as Transformer networks. Details of an exemplary transformer network can be found at http://papers.nips.cc/paper/7181-attention-is-all-you-need.pdf.

In some implementations, machine-learned model 300 can be or include one or more convolutional neural networks. In some instances, a convolutional neural network can include one or more convolutional layers that perform convolutions over input data using learned filters.

Filters can also be referred to as kernels. Convolutional neural networks can be especially useful for vision problems such as when the input data includes imagery such as still images or video. However, convolutional neural networks can also be applied for natural language processing.

In some examples, machine-learned model 300 can be or include one or more generative networks such as, for example, generative adversarial networks. Generative networks can be used to generate new data such as new images or other content.

Machine-learned model 300 may be or include an autoencoder. In some instances, the aim of an autoencoder is to learn a representation (e.g., a lower-dimensional encoding) for a set of data, typically for the purpose of dimensionality reduction. For example, in some instances, an autoencoder can seek to encode the input data and the provide output data that reconstructs the input data from the encoding. Recently, the autoencoder concept has become more widely used for learning generative models of data. In some instances, the autoencoder can include additional losses beyond reconstructing the input data.

Machine-learned model 300 may be or include one or more other forms of artificial neural networks such as, for example, deep Boltzmann machines; deep belief networks; stacked autoencoders; etc. Any of the neural networks described herein can be combined (e.g., stacked) to form more complex networks.

One or more neural networks can be used to provide an embedding based on the input data. For example, the embedding can be a representation of knowledge abstracted from the input data into one or more learned dimensions. In some instances, embeddings can be a useful source for identifying related entities. In some instances, embeddings can be extracted from the output of the network, while in other instances embeddings can be extracted from any hidden node or layer of the network (e.g., a close to final but not final layer of the network). Embeddings can be useful for performing auto suggest next video, product suggestion, entity or object recognition, etc. In some instances, embeddings be useful inputs for downstream models. For example, embeddings can be useful to generalize input data (e.g., search queries) for a downstream model or processing system.

Machine-learned model 300 may include one or more clustering models such as, for example, k-means clustering models; k-medians clustering models; expectation maximization models; hierarchical clustering models; etc.

In some implementations, machine-learned model 300 can perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, machine-learned model 300 can perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; etc.

In some implementations, machine-learned model 300 can be an autoregressive model. In some instances, an autoregressive model can specify that the output data depends linearly on its own previous values and on a stochastic term. In some instances, an autoregressive model can take the form of a stochastic difference equation. One example autoregressive model is WaveNet, which is a generative model for raw audio.

In some implementations, machine-learned model 300 can include or form part of a multiple model ensemble. As one example, bootstrap aggregating can be performed, which can also be referred to as "bagging." In bootstrap aggregating, a training dataset is split into a number of subsets (e.g., through random sampling with replacement) and a plurality of models are respectively trained on the number of subsets. At inference time, respective outputs of the plurality of models can be combined (e.g., through averaging, voting, or other techniques) and used as the output of the ensemble.

One example ensemble is a random forest, which can also be referred to as a random decision forest. Random forests are an ensemble learning method for classification, regression, and other tasks. Random forests are generated by producing a plurality of decision trees at training time. In some instances, at inference time, the class that is the mode of the classes (classification) or the mean prediction (regression) of the individual trees can be used as the output of the forest. Random decision forests can correct for decision trees' tendency to overfit their training set.

Another example ensemble technique is stacking, which can, in some instances, be referred to as stacked generalization. Stacking includes training a combiner model to blend or otherwise combine the predictions of several other machine-learned models. Thus, a plurality of machine-learned models (e.g., of same or different type) can be trained based on training data. In addition, a combiner model can be trained to take the predictions from the other machine-learned models as inputs and, in response, produce a final inference or prediction. In some instances, a single-layer logistic regression model can be used as the combiner model.

Another example ensemble technique is boosting. Boosting can include incrementally building an ensemble by iteratively training weak models and then adding to a final strong model. For example, in some instances, each new model can be trained to emphasize the training examples that previous models misinterpreted (e.g., misclassified). For example, a weight associated with each of such misinterpreted examples can be increased. One common implementation of boosting is AdaBoost, which can also be referred to as Adaptive Boosting. Other example boosting techniques include LPBoost; TotalBoost; BrownBoost; xgboost; MadaBoost, LogitBoost, gradient boosting; etc. Furthermore, any of the models described above (e.g., regression models and artificial neural networks) can be combined to form an ensemble. As an example, an ensemble can include a top-level machine-learned model or a heuristic function to combine and/or weight the outputs of the models that form the ensemble.

In some implementations, multiple machine-learned models (e.g., that form an ensemble can be linked and trained jointly (e.g., through backpropagation of errors sequentially through the model ensemble). However, in some implementations, only a subset (e.g., one) of the jointly trained models is used for inference.

In some implementations, machine-learned model 300 can be used to preprocess the input data for subsequent input into another model. For example, machine-learned model 300 can perform dimensionality reduction techniques and embeddings (e.g., matrix factorization, principal components analysis, singular value decomposition, word2vec/GLOVE, and/or related approaches); clustering; and even classification and regression for downstream consumption. Many of these techniques have been discussed above and will be further discussed below.

As discussed above, machine-learned model 300 can be trained or otherwise configured to receive the input data and, in response, provide the output data. The input data can include different types, forms, or variations of input data. As examples, in various implementations, the input data can include features that describe the content (or portion of content) initially selected by the user, e.g., content of user-selected document or image, links pointing to the user selection, links within the user selection relating to other files available on device or cloud, metadata of user selection, etc. Additionally, with user permission, the input data includes the context of user usage, either obtained from app itself or from other sources. Examples of usage context include breadth of share (sharing publicly, or with a large group, or privately, or a specific person), context of share, etc. When permitted by the user, additional input data can include the state of the device, e.g., the location of the device, the apps running on the device, etc.

In some implementations, machine-learned model 300 can receive and use the input data in its raw form. In some implementations, the raw input data can be preprocessed. Thus, in addition or alternatively to the raw input data, machine-learned model 300 can receive and use the preprocessed input data.

In some implementations, preprocessing the input data can include extracting one or more additional features from the raw input data. For example, feature extraction techniques can be applied to the input data to generate one or more new, additional features. Example feature extraction techniques include edge detection; corner detection; blob detection; ridge detection; scale-invariant feature transform; motion detection; optical flow; Hough transform; etc.

In some implementations, the extracted features can include or be derived from transformations of the input data into other domains and/or dimensions. As an example, the extracted features can include or be derived from transformations of the input data into the frequency domain. For example, wavelet transformations and/or fast Fourier transforms can be performed on the input data to generate additional features.

In some implementations, the extracted features can include statistics calculated from the input data or certain portions or dimensions of the input data. Example statistics include the mode, mean, maximum, minimum, or other metrics of the input data or portions thereof.

In some implementations, as described above, the input data can be sequential in nature. In some instances, the sequential input data can be generated by sampling or otherwise segmenting a stream of input data. As one example, frames can be extracted from a video. In some implementations, sequential data can be made non-sequential through summarization.

As another example preprocessing technique, portions of the input data can be imputed. For example, additional synthetic input data can be generated through interpolation and/or extrapolation.

As another example preprocessing technique, some or all of the input data can be scaled, standardized, normalized, generalized, and/or regularized. Example regularization techniques include ridge regression; least absolute shrinkage and selection operator (LASSO); elastic net; least-angle regression; cross-validation; L1 regularization; L2 regularization; etc. As one example, some or all of the input data can be normalized by subtracting the mean across a given dimension's feature values from each individual feature value and then dividing by the standard deviation or other metric.

As another example preprocessing technique, some or all or the input data can be quantized or discretized. In some cases, qualitative features or variables included in the input data can be converted to quantitative features or variables. For example, one hot encoding can be performed.

In some examples, dimensionality reduction techniques can be applied to the input data prior to input into machine-learned model 300. Several examples of dimensionality reduction techniques are provided above, including, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, during training, the input data can be intentionally deformed in any number of ways to increase model robustness, generalization, or other qualities. Example techniques to deform the input data include adding noise; changing color, shade, or hue; magnification; segmentation; amplification; etc.

In response to receipt of the input data, machine-learned model 300 can provide the output data. The output data can include different types, forms, or variations of output data. As examples, in various implementations, the output data can include content, either stored locally on the user device or in the cloud, that is relevantly shareable along with the initial content selection.

As discussed above, in some implementations, the output data can include various types of classification data (e.g., binary classification, multiclass classification, single label, multi-label, discrete classification, regressive classification, probabilistic classification, etc.) or can include various types of regressive data (e.g., linear regression, polynomial regression, nonlinear regression, simple regression, multiple regression, etc.). In other instances, the output data can include clustering data, anomaly detection data, recommendation data, or any of the other forms of output data discussed above.

In some implementations, the output data can influence downstream processes or decision making. As one example, in some implementations, the output data can be interpreted and/or acted upon by a rules-based regulator.

The present disclosure provides systems and methods that include or otherwise leverage one or more machine-learned models described herein to classify words in in a document as either being a candidate hyperlink or not being a candidate hyperlink, and to suggest one or more candidate documents that are to be linked from each of the sequence of one or more words classified as being a candidate hyperlink, based on features of each of the one or more candidate documents as well as textual context of the sequence of one or more words classified as being candidate hyperlinks. Any of the different types or forms of input data described above can be combined with any of the different types or forms of machine-learned models described above to provide any of the different types or forms of output data described above.

The systems and methods of the present disclosure can be implemented by or otherwise executed on one or more computing devices. Example computing devices include user computing devices (e.g., laptops, desktops, and mobile computing devices such as tablets, smartphones, wearable computing devices, etc.); embedded computing devices (e.g., devices embedded within a vehicle, camera, image sensor, industrial machine, satellite, gaming console or controller, or home appliance such as a refrigerator, thermostat, energy meter, home energy manager, smart home assistant, etc.); server computing devices (e.g., database servers, parameter servers, file servers, mail servers, print servers, web servers, game servers, application servers, etc.); dedicated, specialized model processing or training devices; virtual computing devices; other computing devices or computing infrastructure; or combinations thereof.

Figure 3B:
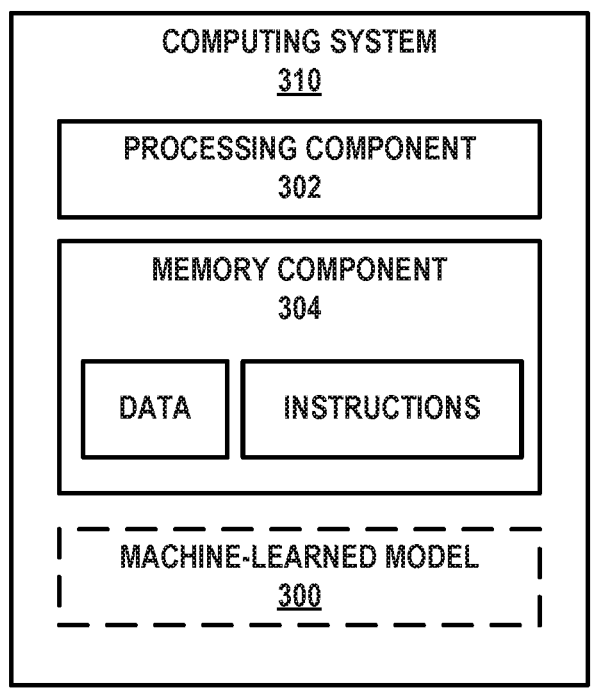

FIG. 3B illustrates a conceptual diagram of computing system 310, which is an example of document system 130 of FIG. 1 and document system 230 of FIG. 2. Computing system 310 includes processing component 302, memory component 304 and machine-learned model 300. Computing system 310 may store and implement machine-learned model 300 locally (i.e., on-device). Output data obtained through local implementation of machine-learned model 300 at computing system 310 can be used to improve performance of the computing system 310.

Figure 3C:
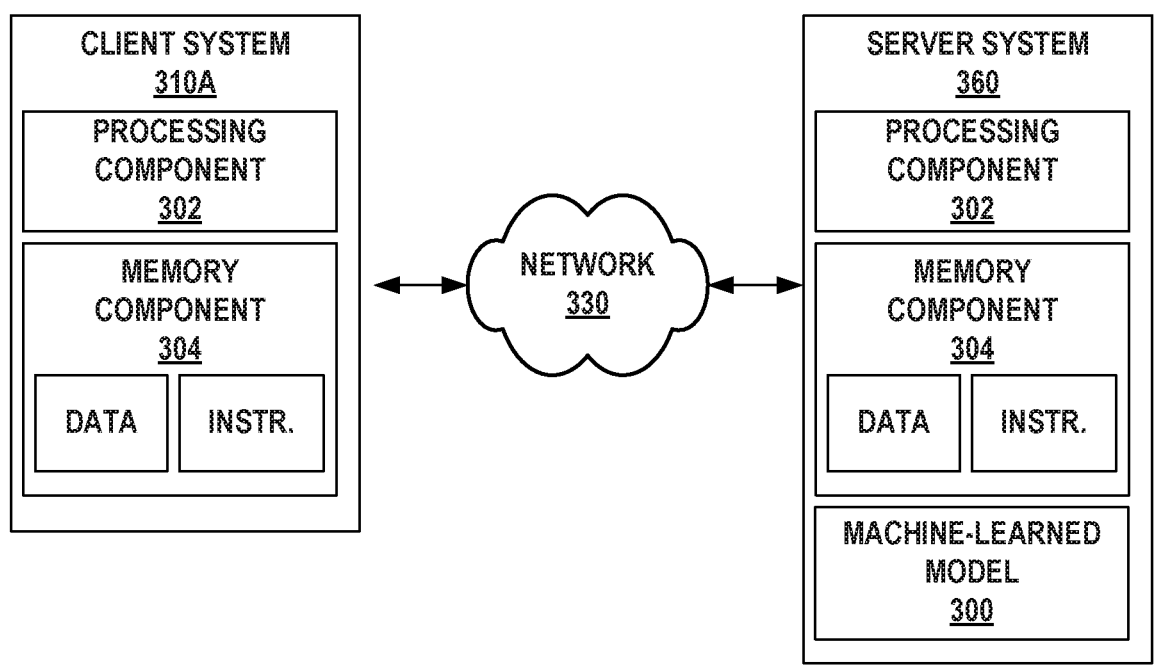

FIG. 3C illustrates a conceptual diagram of an example computing system that can communicate over a network with an example server computing system that includes a machine-learned model. FIG. 3C includes client device 310A communicating with server device 360 over network 330. Client device system is an example of document system 130 of FIG. 1 and document system 230 of FIG. 2, server device 360 is an example of one of remote systems 140 of FIG. 1, and network 330 is an example of network 120 of FIG. 1. Server device 360 stores and implements machine-learned model 300. In some instances, output data obtained through machine-learned model 300 at server device 360 can be used to improve other server tasks or can be used by other non-user devices to improve services performed by or for such other non-user devices. For example, the output data can improve other downstream processes performed by server device 360 for a computing device of a user or embedded computing device. In other instances, output data obtained through implementation of machine-learned model 300 at server device 360 can be sent to and used by a user computing device, an embedded computing device, or some other client device, such as client device 310A. For example, server device 360 can be said to perform machine learning as a service.

In yet other implementations, different respective portions of machine-learned model 300 can be stored at and/or implemented by some combination of a user computing device; an embedded computing device; a server computing device; etc. In other words, portions of machine-learned model 300 may be distributed in whole or in part amongst client device 310A and server device 360.

Devices 310A and 360 may perform graph processing techniques or other machine learning techniques using one or more machine learning platforms, frameworks, and/or libraries, such as, for example, TensorFlow, Caffe/Caffe2, Theano, Torch/PyTorch, MXnet, CNTK, etc. Devices 310A and 360 may be distributed at different physical locations and connected via one or more networks, including network 330. If configured as distributed computing devices, Devices 310A and 360 may operate according to sequential computing architectures, parallel computing architectures, or combinations thereof. In one example, distributed computing devices can be controlled or guided through use of a parameter server.

In some implementations, multiple instances of machine-learned model 300 can be parallelized to provide increased processing throughput. For example, the multiple instances of machine-learned model 300 can be parallelized on a single processing device or computing device or parallelized across multiple processing devices or computing devices.

Each computing device that implements machine-learned model 300 or other aspects of the present disclosure can include a number of hardware components that enable performance of the techniques described herein. For example, each computing device can include one or more memory devices that store some or all of machine-learned model 300. For example, machine-learned model 300 can be a structured numerical representation that is stored in memory. The one or more memory devices can also include instructions for implementing machine-learned model 300 or performing other operations. Example memory devices include RAM, ROM, EEPROM, EPROM, flash memory devices, magnetic disks, etc., and combinations thereof.

Each computing device can also include one or more processing devices that implement some or all of machine-learned model 300 and/or perform other related operations. Example processing devices include one or more of: a central processing unit (CPU); a visual processing unit (VPU); a graphics processing unit (GPU); a tensor processing unit (TPU); a neural processing unit (NPU); a neural processing engine; a core of a CPU, VPU, GPU, TPU, NPU or other processing device; an application specific integrated circuit (ASIC); a field programmable gate array (FPGA); a co-processor; a controller; or combinations of the processing devices described above. Processing devices can be embedded within other hardware components such as, for example, an image sensor, accelerometer, etc.

Hardware components (e.g., memory devices and/or processing devices) can be spread across multiple physically distributed computing devices and/or virtually distributed computing systems.

Figure 3D:
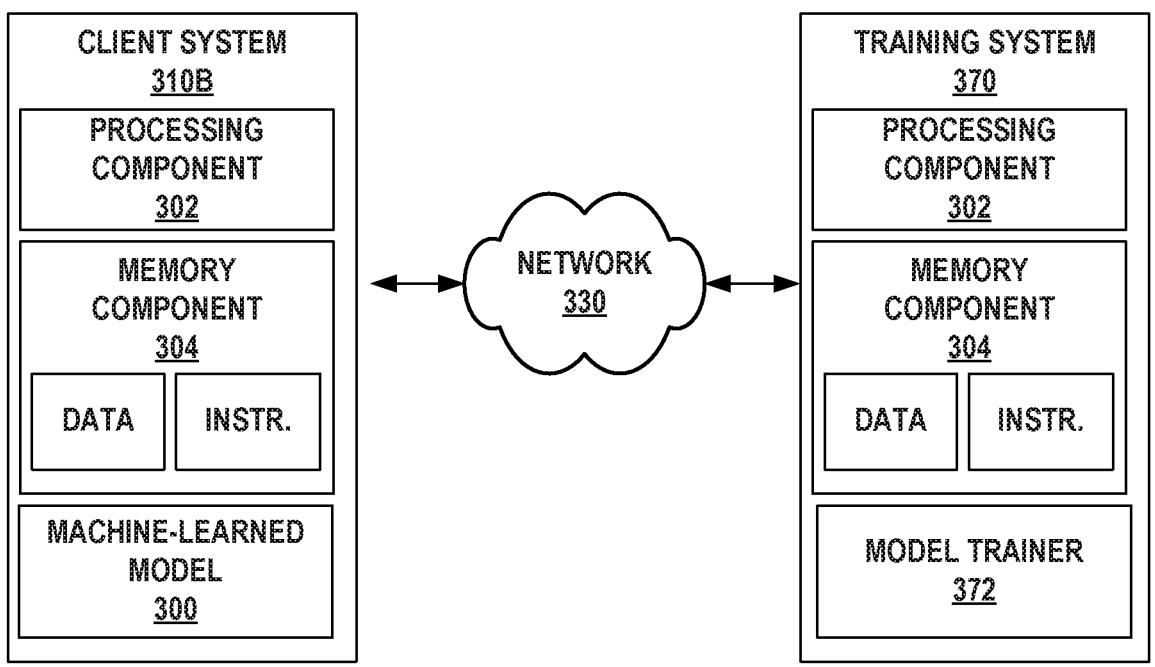

FIG. 3D illustrates a conceptual diagram of an example computing system in communication with an example training computing system that includes a model trainer. FIG. 3D includes client system 310B communicating with training device 370 over network 330. Client system 310B is an example of document system 130 of FIG. 1 and document system 230 of FIG. 2, and network 330 is an example of network 120 of FIG. 1. Machine-learned model 300 described herein can be trained at a training computing system, such as training device 370, and then provided for storage and/or implementation at one or more computing systems, such as client system 310B. For example, model trainer 372 executes locally at training device 370. However, in some examples, training device 370, including model trainer 372, can be included in or separate from client system 310B or any other computing device that implement machine-learned model 300.

In some implementations, machine-learned model 300 may be trained in an offline fashion or an online fashion. In offline training (also known as batch learning), machine-learned model 300 is trained on the entirety of a static set of training data. In online learning, machine-learned model 300 is continuously trained (or re-trained) as new training data becomes available (e.g., while the model is used to perform inference).

Model trainer 372 may perform centralized training of machine-learned model 300 (e.g., based on a centrally stored dataset). In other implementations, decentralized training techniques such as distributed training, federated learning, or the like can be used to train, update, or personalize machine-learned model 300.

Machine-learned model 300 described herein can be trained according to one or more of various different training types or techniques. For example, in some implementations, machine-learned model 300 can be trained by model trainer 372 using supervised learning, in which machine-learned model 300 is trained on a training dataset that includes instances or examples that have labels. The labels can be manually applied by experts, generated through crowd-sourcing, or provided by other techniques (e.g., by physics-based or complex mathematical models). In some implementations, if the user has provided consent, the training examples can be provided by the user computing device. In some implementations, this process can be referred to as personalizing the model.

Figure 3E:
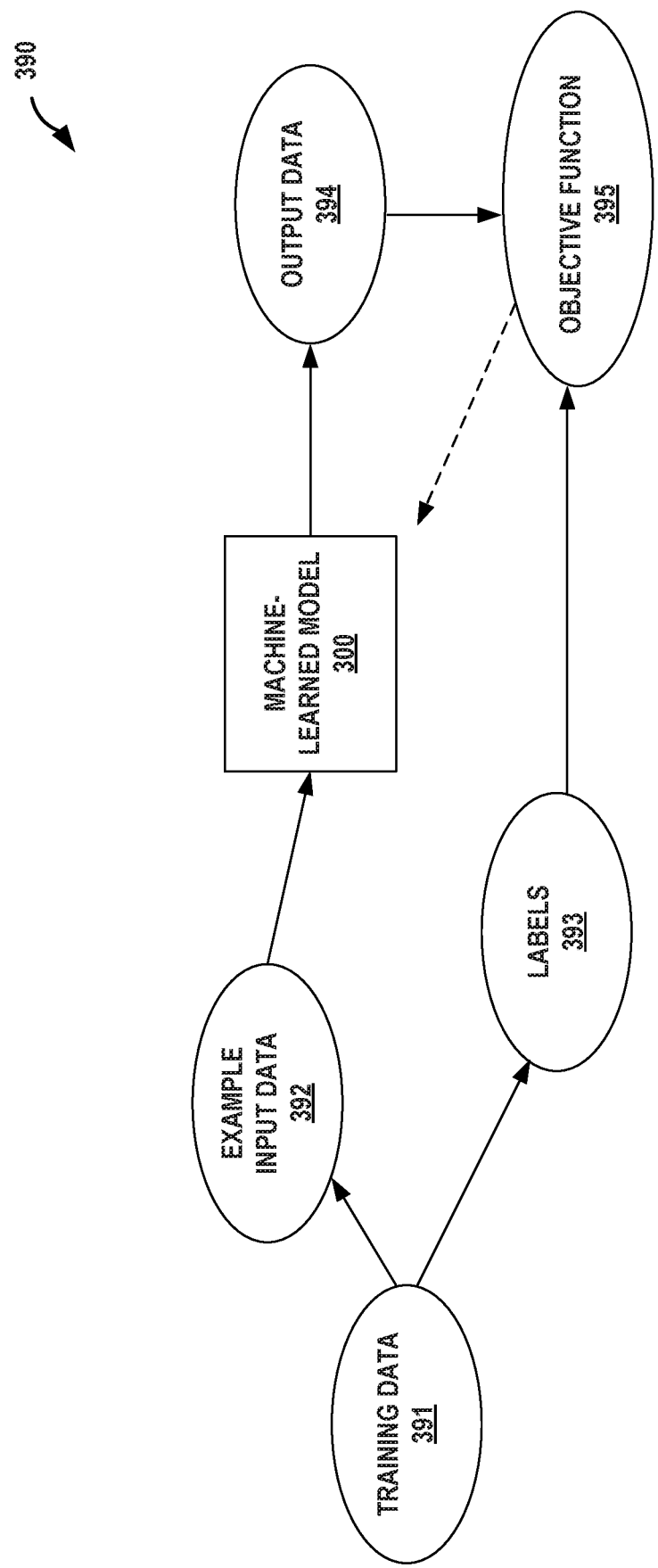

FIG. 3E illustrates a conceptual diagram of training processes 390 which is an example training process in which machine-learned model 300 is trained on training data 391 that includes example input data 392 that has labels 393. Training processes 390 is one example training process; other training processes may be used as well.

Training data 391 used by training processes 390 can include, upon user permission for use of such data for training, anonymized usage logs of sharing flows, e.g., content items that were shared together, bundled content pieces already identified as belonging together, e.g., from entities in a knowledge graph, etc. In some implementations, training data 391 can include examples of input data 392 that have been assigned labels 393 that correspond to output data 394.

In some implementations, machine-learned model 300 can be trained by optimizing an objective function, such as objective function 395. For example, in some implementations, objective function 395 may be or include a loss function that compares (e.g., determines a difference between) output data generated by the model from the training data and labels (e.g., ground-truth labels) associated with the training data. For example, the loss function can evaluate a sum or mean of squared differences between the output data and the labels. In some examples, objective function 395 may be or include a cost function that describes a cost of a certain outcome or output data. Other examples of objective function 395 can include margin-based techniques such as, for example, triplet loss or maximum-margin training.

One or more of various optimization techniques can be performed to optimize objective function 395. For example, the optimization technique(s) can minimize or maximize objective function 395. Example optimization techniques include Hessian-based techniques and gradient-based techniques, such as, for example, coordinate descent; gradient descent (e.g., stochastic gradient descent); subgradient methods; etc. Other optimization techniques include black box optimization techniques and heuristics.

In some implementations, backward propagation of errors can be used in conjunction with an optimization technique (e.g., gradient based techniques) to train machine-learned model 300 (e.g., when machine-learned model is a multi-layer model such as an artificial neural network). For example, an iterative cycle of propagation and model parameter (e.g., weights) update can be performed to train machine-learned model 300. Example backpropagation techniques include truncated backpropagation through time, Levenberg-Marquardt backpropagation, etc.

In some implementations, machine-learned model 300 described herein can be trained using unsupervised learning techniques. Unsupervised learning can include inferring a function to describe hidden structure from unlabeled data. For example, a classification or categorization may not be included in the data. Unsupervised learning techniques can be used to produce machine-learned models capable of performing clustering, anomaly detection, learning latent variable models, or other tasks.

Machine-learned model 300 can be trained using semi-supervised techniques which combine aspects of supervised learning and unsupervised learning. Machine-learned model 300 can be trained or otherwise generated through evolutionary techniques or genetic algorithms. In some implementations, machine-learned model 300 described herein can be trained using reinforcement learning. In reinforcement learning, an agent (e.g., model) can take actions in an environment and learn to maximize rewards and/or minimize penalties that result from such actions. Reinforcement learning can differ from the supervised learning problem in that correct input/output pairs are not presented, nor suboptimal actions explicitly corrected.

In some implementations, one or more generalization techniques can be performed during training to improve the generalization of machine-learned model 300. Generalization techniques can help reduce overfitting of machine-learned model 300 to the training data. Example generalization techniques include dropout techniques; weight decay techniques; batch normalization; early stopping; subset selection; stepwise selection; etc.

In some implementations, machine-learned model 300 described herein can include or otherwise be impacted by a number of hyperparameters, such as, for example, learning rate, number of layers, number of nodes in each layer, number of leaves in a tree, number of clusters; etc. Hyperparameters can affect model performance. Hyperparameters can be hand selected or can be automatically selected through application of techniques such as, for example, grid search; black box optimization techniques (e.g., Bayesian optimization, random search, etc.); gradient-based optimization; etc. Example techniques and/or tools for performing automatic hyperparameter optimization include Hyperopt; Auto-WEKA; Spearmint; Metric Optimization Engine (MOE); etc.

In some implementations, various techniques can be used to optimize and/or adapt the learning rate when the model is trained. Example techniques and/or tools for performing learning rate optimization or adaptation include Adagrad; Adaptive Moment Estimation (ADAM); Adadelta; RMSprop; etc.

In some implementations, transfer learning techniques can be used to provide an initial model from which to begin training of machine-learned model 300 described herein.

In some implementations, machine-learned model 300 described herein can be included in different portions of computer-readable code on a computing device. In one example, machine-learned model 300 can be included in a particular application or program and used (e.g., exclusively) by such particular application or program. Thus, in one example, a computing device can include a number of applications and one or more of such applications can contain its own respective machine learning library and machine-learned model(s).

In another example, machine-learned model 300 described herein can be included in an operating system of a computing device (e.g., in a central intelligence layer of an operating system) and can be called or otherwise used by one or more applications that interact with the operating system. In some implementations, each application can communicate with the central intelligence layer (and model (s) stored therein) using an application programming interface (API) (e.g., a common, public API across all applications).

In some implementations, the central intelligence layer can communicate with a central device data layer. The central device data layer can be a centralized repository of data for the computing device. The central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination.

Databases and applications can be implemented on a single system or distributed across multiple systems. Distributed components can operate sequentially or in parallel.

In addition, the machine learning techniques described herein are readily interchangeable and combinable. Although certain example techniques have been described, many others exist and can be used in conjunction with aspects of the present disclosure.

A brief overview of example machine-learned models and associated techniques has been provided by the present disclosure. For additional details, readers should review the following references: Machine Learning A Probabilistic Perspective (Murphy); Rules of Machine Learning: Best Practices for ML Engineering (Zinkevich); Deep Learning (Goodfellow); Reinforcement Learning: An Introduction (Sutton); and Artificial Intelligence: A Modern Approach (Norvig).

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 4:
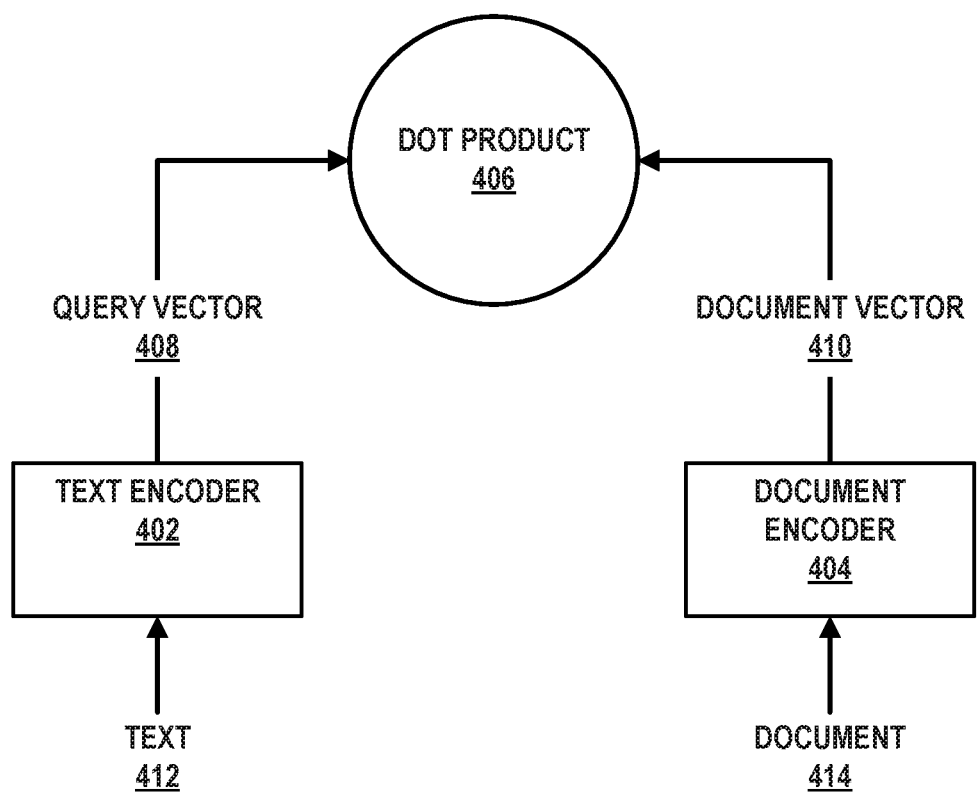
FIG. 4 is a conceptual diagram of an example machine-learned model that may be used to determine one or more candidate documents to be linked from a document that is being edited, according to example implementations of the present disclosure.

FIG. 4 depicts a conceptual diagram of an example machine-learned model that may be used to determine one or more candidate documents to be linked from a document that is being edited, according to example implementations of the present disclosure. As illustrated in FIG. 4, text encoder model 402, document encoder model 404, and dot product model 406 may each be an example of machine-learned models that are included in machine-learned model 238 of FIG. 2 and machine-learned model 300 of FIG. 3, and therefore text encoder model 402, document encoder model 404, and dot product model 406 may implement any of the techniques discussed above with respect to machine-learned model 238 of FIG. 2 and machine-learned model 300 of FIG. 3.

Text encoder model 402 may be trained to determine whether a word or a sequence of one or more words within the body of a document is classified as candidate hyperlink that links to a document. Text encoder model 402 may be trained to receive an indication of a sequence of one or more words within the body of a document as well as indications of context associated with the document, and may determine whether the sequence of one or more words is a candidate hyperlink.

Text encoder model 402 may be trained as a classifier that may perform one of the classification techniques described above with respect to machine-learned model of FIGS. 3A-3E in order to determine whether to classify a word or a sequence of one or more words as a candidate hyperlink. In particular, for a word in the body of a document, text encoder model 402 may be trained to classify the sequence of one or more words based on the sequence of one or more words and context associated with the document that contains the sequence of one or more words. As discussed above, text encoder model 402 may be trained to perform one or more of the following techniques: link detection, pre-triggering, and post-triggering, as discussed above with respect to machine-learned model 238 of FIG. 2. In some examples, text encoder model 402 may encompass separate machine-trained models for performing each of link detection, pre-triggering, and post-triggering. Text encoder model 402 may be trained using training data that includes documents that links to documents in order to classify sequences of one or more words as either being a candidate hyperlink and not being a candidate hyperlink.

Dot product model 406 may also be trained to determine, for a word classified as a candidate hyperlink, one or more candidate documents that are likely to be linked from the sequence of one or more words classified as a candidate hyperlink. Text encoder model 402 may be trained to receive an indication of the sequence of one or more words that is classified as a candidate hyperlink as well as indications of context associated with the document that contains the candidate hyperlink and, in response, generate a query vector associated with the sequence of one or more words based at least in part on the sequence of one or more words and the context. Document encoder model 404 may also be trained to receive indications of a plurality of documents and, in response, generate a document vector for each of the plurality of documents. Dot product model 406 may be trained to determine a dot product score for each of the plurality of documents by performing, for each of the plurality of documents, a dot product of the query vector and the document vector associated with the respective document. Dot product model 406 may be trained to determine one or more candidate documents out of the plurality of documents to be linked from the portion of text based on the dot product scores for the plurality of documents. The quality of a semantic match between a document and a word is computed as the dot product between the query vector and the document vector associated with the sequence of one or more words and the document, respectively, where a higher dot product score denotes a higher quality semantic match. This approach may be advantageous in that models can be trained end-to-end and even fine-tuned on customer-specific data. The best-matching documents (i.e., the documents having associated document vectors that produce the highest dot product scores with the query vector associated with the sequence of one or more words) can be retrieved through fast nearest neighbor search to determine one or more document vectors that are most proximate to a query vector in vector space.

Text encoder model 402 may receive an indication of text 412, which includes an indication of a sequence of one or more words classified as a candidate hyperlink as well as indications of the context associated with the document that contains the sequence of one or more words, such as textual context associated with the sequence of one or more words, and to generate query vector 408 associated with text 412. Similarly, document encoder model 404 may receive an indication of document 414 and to generate document vector 410 associated with document 414. Query vector 408 and document vector 410 may be multi-dimensional vectors of real numbers. Dot product model 406 may be trained to perform the dot product of query vector 408 with the document vector 410 to produce a dot product score associated with document 414, and to determine the one or more candidate documents to be linked from the candidate hyperlink based at least in part on the dot product score.

Text encoder model 402 may be trained to generate query vector 408 from text 412 that captures the semantic meaning of text 412, such as by generating one or more layers on word embeddings of a sequence of one or more words to capture context associated with the sequence of one or more words, so that query vector 408 is a vector representation of text 412. Thus, when text encoder model 402 generates vectors from texts that have similar semantic meanings, the generated vectors may be located in close proximity to one another in a vector space. In other words, text encoder model 402 may generate similar vectors (e.g., vectors having a high cosine similarity) from texts that have similar semantic meanings. In some examples, text encoder model 402 may implement any suitable techniques for computing vector representations of words, such as word2vec and the like.

Text encoder model 402 may implicitly learn semantic similarity between texts, in order to generate query vectors, based at least in part on machine learning from training data that includes conversational data. For example, text encoder model 402 may be trained via unsupervised learning to predict responses to text input (i.e., next message prediction) using datasets of comments and replies from online discussions websites for general language understanding. Text encoder model 402 may also be trained to predict responses to text input using datasets of messages and replies from organization-specific (e.g., company-specific) messaging systems (e.g., company e-mail system), organization-specific collaboration tools, and the like for organization-specific language understanding, which may be useful if machine-learned model 400 is used for communicating within an organization. Text encoder model 402 may also be trained to predict documents to be linked from messages and documents, as well as documents to be attached to messages. Text encoder model 402 may be trained via unsupervised learning using training data such as document corpora such as word processing documents, spreadsheets and presentation documents, and supervised training using labeled data such as document and linked document pairs, labeled data such as e-mail and attachment pairs, links to web pages, and web pages.

Because text input that elicit the same responses are likely to have the same or similar semantic meanings, training text encoder model 402 to predict responses to text input also trains text encoder model 402 to determine that different text input have the same semantic meaning if the same response is predicted for each of the different pieces of texts. In this way, text encoder model 402 may be trained to generate similar query vectors (i.e., vectors that are located in close proximity to one another in vector space) from different text input that have similar semantic meanings. It should be understood that text encoder model 402 may also be trained via any other suitable machine learning techniques to generate similar vectors from text input that have similar semantic meanings.

Document encoder model 404 may generate document vector 410 from document 414. In particular, document encoder model 404 may be trained to generate document vector 410 from document 414 as a document embeddings to represent the features of document 414. Document encoder model 404 may be trained to generate document vector 410 in such a way that the dot product score from dot product model 406 performing dot product of document vector 410 and query vector 408 is relatively large if the candidate hyperlink within text 412 is relatively more likely to link to document 414, and that the dot product score is relatively small if the candidate hyperlink within text 412 is relatively less likely to link to document 414.

Document encoder model 404 may generate document vector 410 based at least in part on one or more features of document 414, such that document vector 410 represents the features of document 414. The one or more features of document 414 that are used by document encoder model 404 to generate document vector 410 may include one or more of: a subject of the document, a title of the document, contents of the document, a type of the document, a time of when the document was last opened by the user, a frequency of the document being opened by the user, a frequency of the document being edited by the user, a frequency of the document being shared by the user, the age of the document, a time of when the document was created, a time of when the document was last edited, the sharing settings of the document, the author of the document, the collaborators of the document, user-provided metadata for the document, and the like.

The subject of document 414 and the title of document 414 may include the file name of document 414 and/or a document heading or document title within the contents of document 414. Examples of types of documents may include word processing documents, spreadsheet documents, presentation documents, video files, pictures, and the like, and the type of document 414 may be indicated by a media type (e.g., a Multipurpose Internet Mail Extensions) type associated with document 414. The time of when document 414 was created, the time of when document 414 was last opened, the time of when document 414 was last edited, the age of document 414, the frequency of document 414 being opened, the frequency of document 414 being edited, the frequency of document 414 being shared, the sharing settings of document 414, the author of document 414, and/or the collaborators of document 414 may be features that indicate how the user composing the document 414 interacts with document 414. The user-provided metadata for document 414 may include an indication that a user has added document 414 to the user's bookmark or favorites list, such as by the user starring document 414.

Document encoder model 404 may be trained via machine learning using training data that includes pairs of messages and documents linked from the messages to generate document vectors for documents based on the training. For example, text encoder model 402 may be trained to predict a document to be linked from a message by performing machine learning over training data that contain pairs of messages and documents linked from the messages. The pairs of messages and documents linked from the messages may be from a variety of sources. For example, the datasets may include message-linked document pairs from within a particular organization (e.g., a company). Such message-linked document pairs from within a particular organization may be used to train document encoder model 404 regarding the document linking behavior within the particular organization In another example, the datasets may include message-linked document pairs from users who have given their explicit consent to having their messages be used for the purposes of machine learning. These message-linked document pairs may, for example, be from users of a consumer messaging service (e.g., an e-mail service) who have explicitly opted-in to their messages being used for the purposes of machine learning. By training document encoder model 404 using training data that includes message-linked document pairs, document encoder model 404, document encoder model 404 may be able to infer associations between documents and messages, and in particular associations between features of messages and features of documents that are linked from the messages.

Similar to text encoder model 402, document encoder model 404 may implicitly learn semantic similarity between texts based at least in part on machine learning from conversational data. For example, document encoder model 404 may be trained via unsupervised learning to predict responses to text input (i.e., next message prediction) using datasets of comments and replies from online discussions websites for general language understanding. Document encoder model 404 may also be trained to predict responses to text input using datasets of messages and replies from organization-specific (e.g., company-specific) messaging systems (e.g., company e-mail system), organization-specific collaboration tools, and the like for organization-specific language understanding, which may be useful if machine-learned model 300 is used internally for communicating within an organization.

Because text input that elicit the same responses are likely to have the same or similar semantic meanings, training document encoder model 404 to predict responses to text input also trains document encoder model 404 to determine that different text inputs and messages have similar semantic meaning if the same response is predicted for each of the different texts and messages. In this way, document encoder model 404 may be trained to encode document vectors based at least in part on the semantic meanings of the contents of the documents.

Document encoder model 404 may also be trained to infer whether one document is similar to another a document. If document encoder model 404 infers that a document is likely to be linked from a particular text or message, then document encoder model 404 may also infer that other documents that are similar to the document may also be likely to be linked from the same particular text or message. When document encoder model 404 generates vectors for similar documents, the generated vectors may be located in close proximity to one another in a vector space (e.g., having a high cosine similarity). In other words, document encoder model 404 may generate similar vectors from similar documents.

Document encoder model 404 may be trained to infer whether documents are similar based at least in part on the features of the respective documents. Features of documents that may be used to determine the similarity of the documents may include one or more of: a subject of the document, a title of the document, a structure of the document, a type of the document, contents of the document, the semantic meanings of the documents, a time of when the document was last opened, a frequency of the document being opened, a frequency of the document being edited, or a frequency of the document being shared.

Document encoder model 404 may determine a document vector for a document based on features of the document, which may include the title or subject of the document as well as the structure of the document by being trained via machine learning to perform next paragraph prediction, beginning of document prediction, and/or random paragraph prediction. Next paragraph prediction is the prediction of a subsequent paragraph of a document based on one or more preceding paragraphs of the document Beginning of document prediction is the prediction of the beginning portion of the document (e.g., the title or subject of the document) based on one or more subsequent portions of the document. Random paragraph prediction is taking a random paragraph of a document as input and predicting the title of the document and predicting another random paragraph of the document based on the input. By training document encoder model 404 on documents for next paragraph prediction, beginning of document prediction, and/or random paragraph prediction document encoder model 404 may infer the structure of documents, how documents are written, and how document titles are composed. By being trained to infer such information regarding documents, document encoder model 404 is able to determine whether the title or subject of a document is similar to that of another document, or whether the structure of a document is similar to that of another document, for the purposes of generating document vectors based on features of documents such as their titles and/or subjects.

In this way, text encoder model 402 may be trained to transform a word and its textual context into a multi-dimensional real-valued vector that represents the semantic meaning of the sequence of one or more words and its textual context. Similarly, document encoder model 404 may be trained to transform a document into a multi-dimensional real-valued vector that represents the semantic meaning of its textual context. Thus, determining the dot product score of a query vector and a document vector thereby determines the semantic match between the sequence of one or more words and textual context represented by the query vector and the document represented by the document vector, where the dot product score between the query vector and the document vector represents the quality of the semantic match between the query vector and the document vector.

In some examples, text encoder model 402 and document encoder model 404 may be customized for specific organizations, companies, and the like. Text encoder model 402 and document encoder model 404 may be trained based on general corpora of information, such as input using datasets of comments and replies from general online discussions web sites, a general corpora of e-mail messages, and the like to produce general text encoder and document encoder models. Text encoder model 402 and document encoder model 404 may then be trained on organization-specific training data to customize text encoder model 402 and document encoder model 404 for specific organizations.

Figure 5:
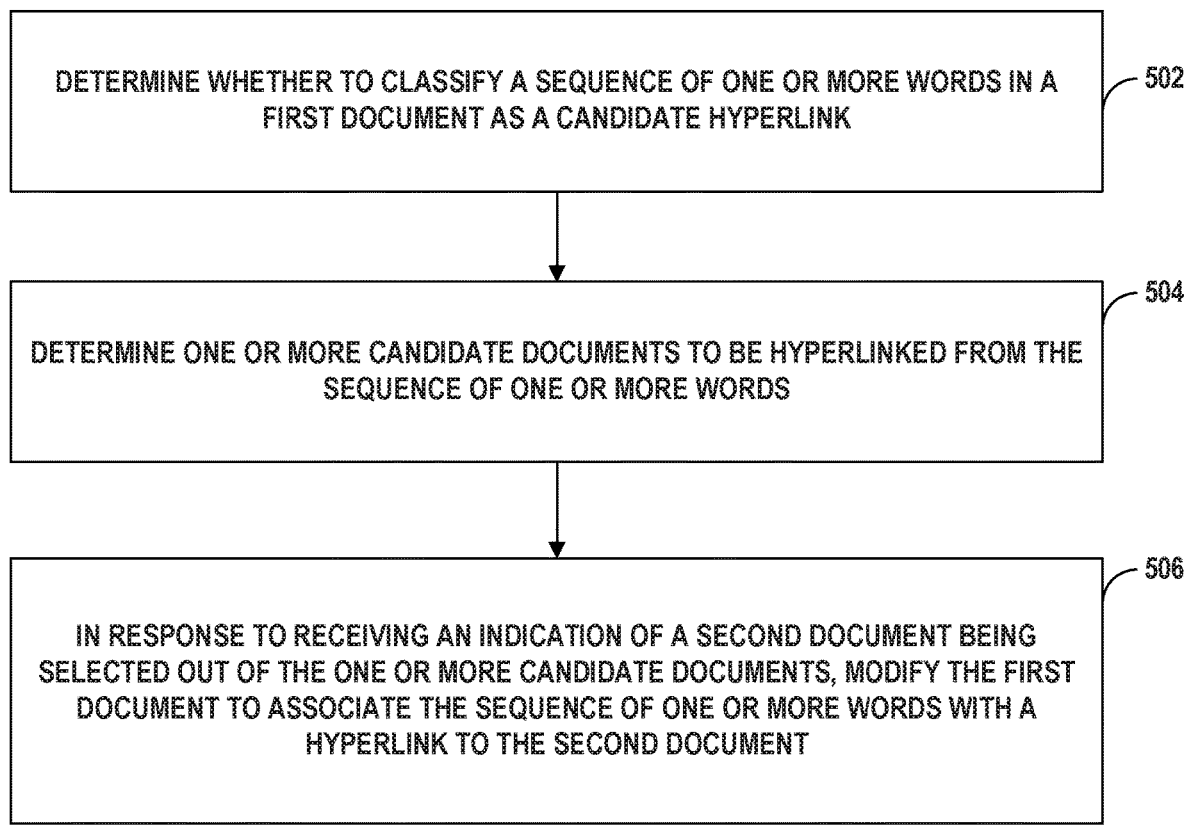
FIG. 5 is a flow diagram illustrating example operations of a computing system for selectively providing predicted document suggestions to a user that is editing a document, in accordance with one or more aspects of the present disclosure.

FIG. 5 is a flow diagram illustrating example operations of a computing system for selectively providing predicted document suggestions to a document that is being edited, in accordance with one or more aspects of the present disclosure. For purposes of illustration only, the example operations of FIG. 5 are described below within the context of FIGS. 1-4.

In the example of FIG. 5, document system 230 may determine, using machine-learned model 238, whether to classify a sequence of one or more words within a first document (e.g., document 112) that is being edited as a candidate hyperlink based at least in part on the sequence of one or more words and context associated with the first document (502). Document system 230 may, in response to classifying the sequence of one or more words as the candidate hyperlink, determine, using machine-learned model 238 and based at least in part on the sequence of one or more words and the context, one or more candidate document to be hyperlinked from the sequence of one or more words out of a plurality of documents (504). Document system 230 may, in response to receiving an indication of a second document being selected out of the one or more candidate documents, modify the first document to associate the sequence of one or more words with a hyperlink to the second document (506).

In some examples, the first document may comprise an electronic message (e.g., an e-mail message), where the context associated with the first document may include textual context associated with the sequence of one or more words, and where determining the one or more candidate documents to be hyperlinked from the sequence of one or more words out of the plurality of documents may further include determining, using machine-learned model 238 and based at least in part on the sequence of one or more words and the textual context associated with the sequence one or more words, the one or more candidate documents to be hyperlinked from the sequence of one or more words out of the plurality of documents, and sending, to a recipient, the electronic message that includes the hyperlink to the second document.

In some examples, determining the one or more candidate documents to be hyperlinked from the sequence of one or more words out of the plurality of documents may further include document system 230 generating, using machine-learned model 238, a query vector associated with the sequence of one or more words based at least in part on the sequence of one or more words and the context associated with the first document. Document system 230 may further generate, using machine-learned model 238, a plurality of document vectors associated with the plurality of documents. Document system 230 may further determine, using machine-learned model 238, a plurality of dot product scores associated with the plurality of documents by performing a dot product of the query vector with each of the plurality of document vectors. Document system 230 may further determine, using machine-learned model 238, the one or more candidate documents to be hyperlinked from the sequence of one or more words out of the plurality of documents based at least in part on one or more dot product scores associated with the one or more candidate documents.

In some example, the query vector and the plurality of document vectors is each a multi-dimensional real-valued embedding vector. In some examples, machine-learned model 238 is trained using machine learning such that the dot product score of the dot product of the query vector with a document vector associated with the second document represents a likelihood that the sequence of one or more words associated with the query vector links to the second document associated with the document vector.

In some examples, document system 230 may further generate, using machine-learned model 238, the document vector associated with the second document based at least in part on one or more of: a subject of the second document, a title of the second document, content of the second document, a type of the second document, a time when the second document was created, the time when the second document was last opened, the time when the second document was last edited, a frequency of the second document being opened, a frequency of the second document being edited, a frequency of the second document being shared, one or more authors of the second document, one or more collaborators of the second document, sharing settings of the second document, or user-provided metadata associated with the second document.

In some examples, the machine-learned model is further trained via next message prediction. In some examples, the machine-learned model is further trained via one or more of: next paragraph prediction, beginning of document prediction, or random paragraph prediction to determine the document vector associated with the second document. In some examples, the machine-learned model is further trained using training data that includes pairs of first documents and second documents linked or attached to the first documents. In some examples, the context associated with the first document includes one or more of: textual context associated with the sequence of one or more words, an author of the first document, a recipient of the first document, a title of the first document, contents of the first document, activity associated with the first document, a time of when the first document was last edited, or previous messages in a thread of messages that includes the first document.

In some examples, machine-learned model 238 may include a machine-trained classifier that classifies the sequence of one or more words as the candidate hyperlink based at least in part on the sequence of one or more words and context associated with the first document.

Figure 6A:
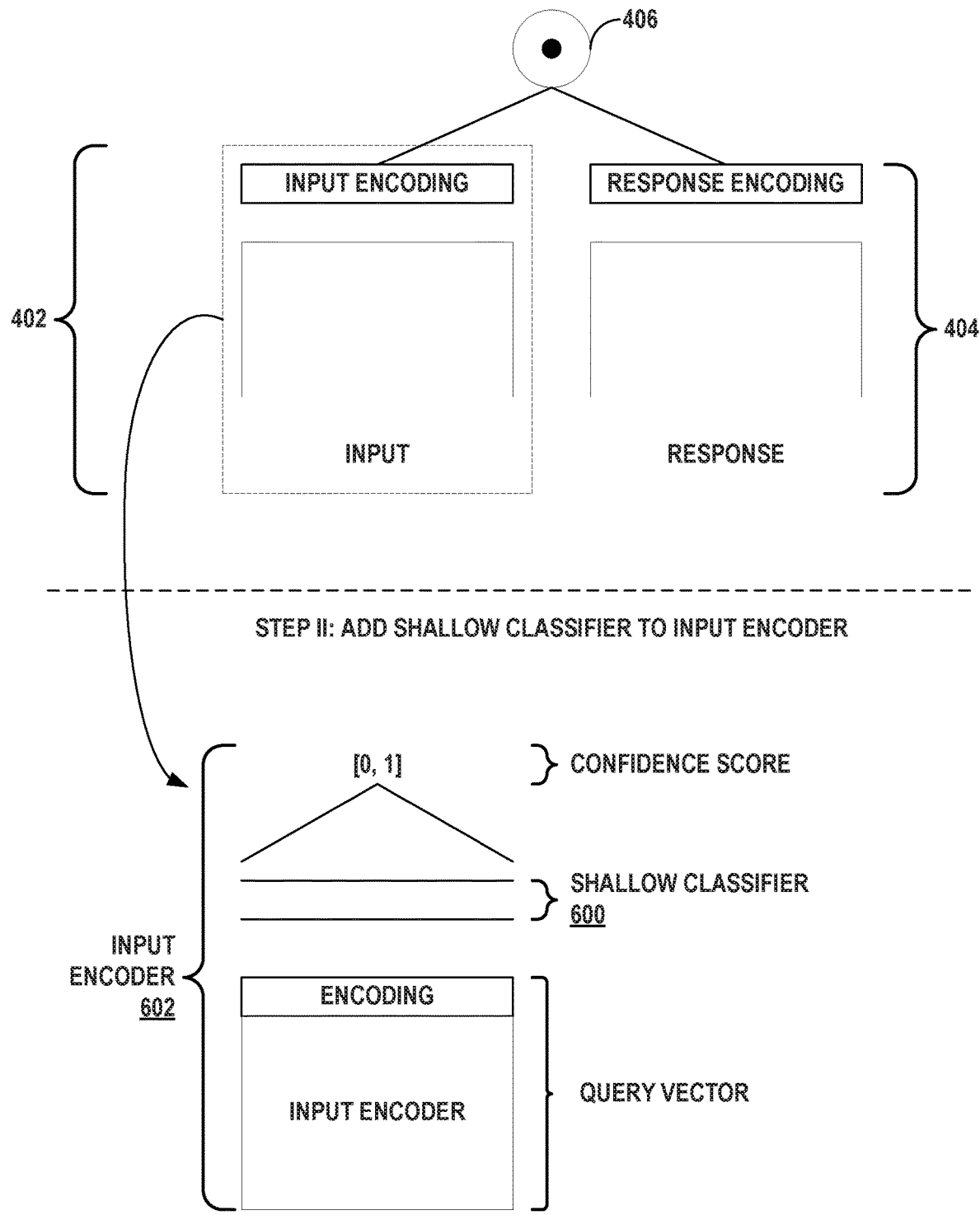
FIGS. 6A and 6B are diagrams illustrating example application of a query vector classifier and pattern identification in accordance with various aspects of the automated document hyperlinking techniques described in this disclosure.
Figure 6B:
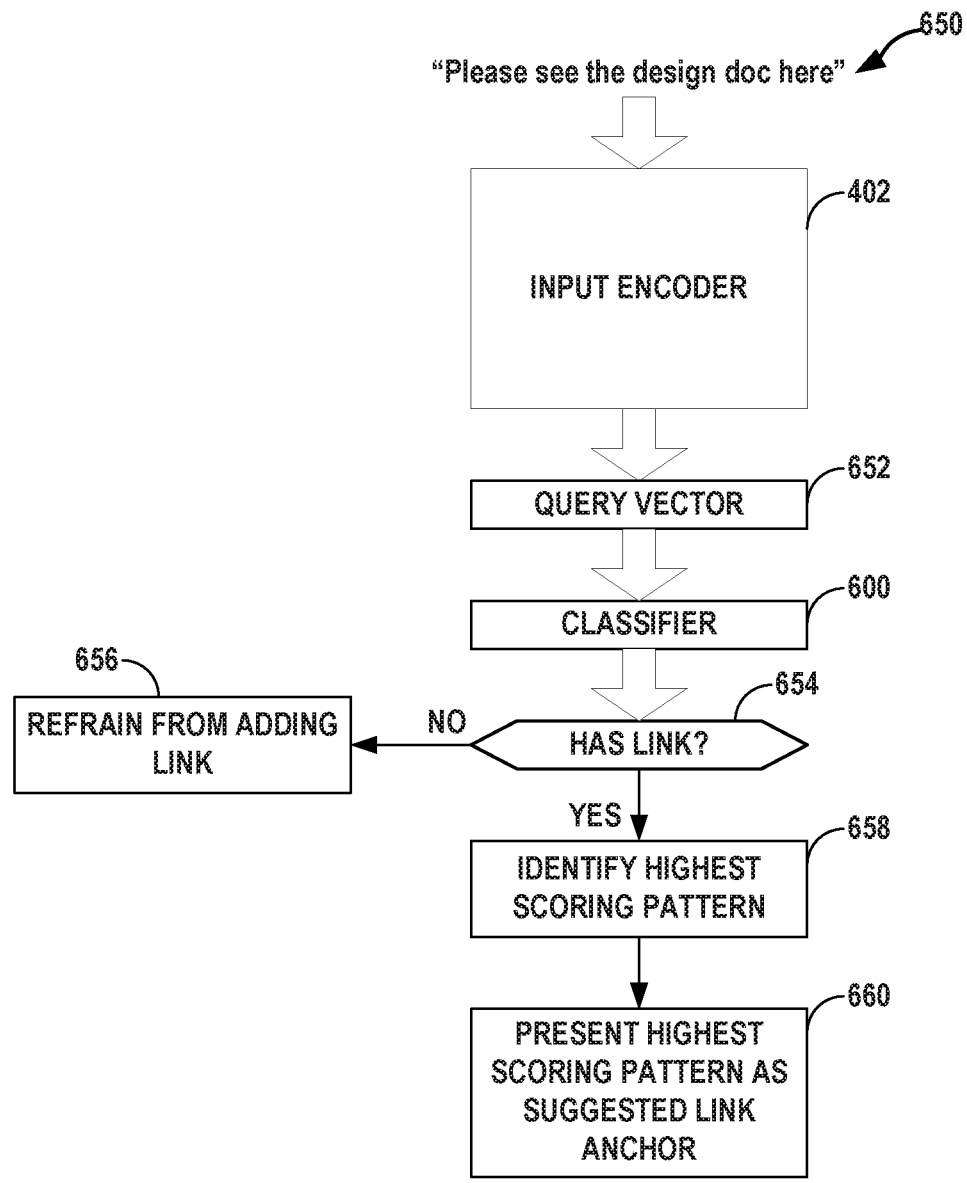

FIGS. 6A and 6B are diagrams illustrating example application of a query vector classifier and pattern identification in accordance with various aspects of the automated document hyperlinking techniques described in this disclosure. Machine-learned model 238 may include dot product model 406, a text encoder model 402 (which may also be referred to as an "input encoder 402"), and a document encoder model 404 (which may be referred to as a "response encoder 404"), where the input encoder 402 and the response encoder 406 may undergo training as described above during a so-called "step I." In some instances, the term "dot product model" may refer to the collection of dot product model 406, input encoder 402, and response encoder 404.

As further shown in the example of FIG. 6A, machine-learned model 238 may, during a second step (shown as "step II"), copy input encoder 402 and add a shallow classifier 600, resulting in input encoder 602. Input encoder 402 may, as a result of training, be configured to represent semantic information about input text, which can be leveraged when training shallow classifier 600 (as trained input encoder 402 may allow for less training and data required when training shallow classifier 600).

As such, input encoder 602 may include shallow classifier 600 that processes the results of input encoder 402. Shallow classifier 600 may predict whether an input text is referencing a link anchor. The input (and, in some examples, the only input) to shallow classifier 600 is a query vector obtained when encoding the input. Because the query vector already represents learned semantic information, shallow classifier 600 may leverage the learned semantic information. Shallow classifier 600 undergoes training on (sentence, has_link) labeled examples, where the "sentence" value refers to example input text, and the "has_link" refers to an indication of whether the corresponding example input text has a hyperlink or does not have a hyperlink. Shallow classifier 600, once trained, may be configured to predict whether a sentence should contain a link.

In the example of FIG. 6B, machine-learned model 238 detects link anchors (e.g., possible candidates of one or more words of the input text to be associated with the hyperlink) within input text 650 in two stages. During the first stage, machine-learned model 238 is configured to apply input encoder 402 to obtain query vector 652, to which machine-learned model 238 is next configured to apply classifier 600. Classifier 600 predicts whether or not query vector 652 should include a link (654).

When classifier 600 predicts that query vector 652 should not include a link ("NO" 654), machine-learned model 238 may refrain from adding a link (656). However, when classifier 600 predicts that query vector 652 should include a link ("YES" 654), machine-learned model 238 is configured to reference a database of frequent link anchors to identify a most likely link anchor (in terms of being used for a link anchor) within input text 650.

To identify the most likely link anchor, classifier 600 may provide one or more likelihood scores identifying a likelihood that the one or more words of the sequence (e.g., input text 650) are to be anchors for the hyperlink to the second document. Assume for purpose of illustration that classifier 600 generates the following likelihood scores (which is another way to refer to confidence scores) for example input text 650—"Please see the design doc here."

| Pattern | Link Likelihood |
|---|---|
| "here" | 0.3 |
| "design doc" | 0.8 |
| "slides" | 0.7 |
| "doc" | 0.6 |

In this example, machine-learned model 238 may select the pattern "design doc" as the "design doc" pattern has the highest likelihood score of 0.8. Machine-learned model 238 may combine the likelihood score with one or more frequent link anchor patterns to determine a most likely anchor of the anchors for the hyperlink. Machine-learned model 238 may, in other words, identify a highest scoring pattern (in terms of likelihood score, as one example, 658) and present the highest scoring pattern (such as "design doc") as a suggested link anchor (660).

Machine-learned model 238 may apply the foregoing two-staged approach because the classifier does not predict the exact anchor text so machine-learned model 238 should be trained to detect the anchor text after classification. Further, machine-learned models trained using patterns alone (without classification) may lead to poor performance (such as predicting all occurrences of the word "here" as link candidates), resulting in a poor user experience that frustrates end users through false positives and wastes computing resources (such as processing cycles, power, bandwidth—potentially both memory and network bandwidth, etc.). As such, the techniques described above may improve operation of the computing system itself by reducing false positives, promoting a better user experience and avoiding unnecessary operations that may expend computing power in terms of processing cycles, power, and bandwidth.

Figure 7:
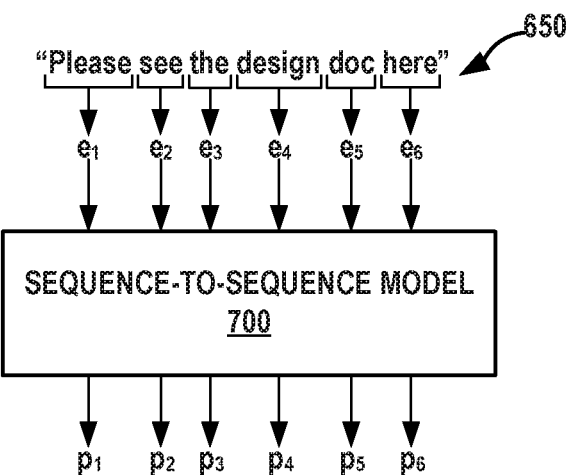
FIG. 7 is a diagram illustrating example application of a sequence-to-sequence model in accordance with various aspects of the automated document hyperlinking techniques described in this disclosure.

FIG. 7 is a diagram illustrating example application of a sequence-to-sequence model in accordance with various aspects of the automated document hyperlinking techniques described in this disclosure. Machine-learned model 238 may, as an alternative to or in combination with the vector classifier and pattern identification, include a sequence-to-sequence model 700 (which may include, as one example, the transformer described above). Sequence-to-sequence model 700 may represent a model configured to receive a variable-length sequence of word, character, and/or byte embeddings (shown as $e_1$-$e_6$) and output another sequence of prediction (shown as $p_1$-$p_6$).

Sequence-to-sequence model 700 is trained to directly receive input text 650 and output link anchor predictions $p_1$-$p_6$. Although described with respect to six embeddings (which may also be referred to more generally as "tokens"), the techniques may be implemented with respect to any number of tokens (e.g., 'N' tokens). Sequence-to-sequence model 700 may output a similar number of predictions as vectors, which machine-learned model 700 may aggregate into a matrix ($P_{n \times l}$) where l refers to a max size span for the embeddings. The matrix P represents, for each position 0, 1, . . . , n, the likelihood of spans of sizes 0, 1, . . . , l. The entry in the matrix $P_{i,j}$ denotes a likelihood of a link anchor starting from position i with a size of j. As an example, for $P_{15, 10}$ for example input text 650, sequence-to-sequence model 700 may predict the span "design doc" has a likelihood score of 0.8 (or an 80% probability of being a link anchor). In this respect, machine-learned model 238 is configured to combine the likelihood score with one or more frequent link anchor patterns (using sequence-to-sequence model 700) to determine a most likely anchor of the anchors for the hyperlink.

The following numbered examples may illustrate one or more aspects of the present disclosure.

Example 1

A method comprising: determining, by the at least one processor using a machine-learned model, whether to classify a sequence of one or more words within a first document that is being edited as a candidate hyperlink based at least in part on the sequence of one or more words and context associated with the first document; in response to classifying the sequence of one or more words as the candidate hyperlink, determining, by the at least one processor using the machine-learned model and based at least in part on the sequence of one or more words and the context, one or more candidate document to be hyperlinked from the sequence of one or more words out of a plurality of documents; and in response to receiving an indication of a second document being selected out of the one or more candidate documents, modifying, by the at least one processor, the first document to associate the sequence of one or more words with a hyperlink to the second document.

Example 2

The method of Example 1, wherein the first document comprises an electronic message, wherein the context associated with the first document comprises textual context associated with the sequence of one or more words, and wherein determining the one or more candidate documents to be hyperlinked from the sequence of one or more words out of the plurality of documents further comprises: determining, by the at least one processor using the machine-learned model and based at least in part on the sequence of one or more words and the textual context associated with the sequence one or more words, the one or more candidate documents to be hyperlinked from the sequence of one or more words out of the plurality of documents; and sending, by the at least one processor to a recipient, the electronic message that includes the hyperlink to the second document.

Example 3

The method of any of Examples 1 and 2, wherein determining the one or more candidate documents to be hyperlinked from the sequence of one or more words out of the plurality of documents further comprises: generating, by the at least one processor and using the machine-learned model, a query vector associated with the sequence of one or more words based at least in part on the sequence of one or more words and the context associated with the first document; generating, by the at least one processor and using the machine-learned model, a plurality of document vectors associated with the plurality of documents; determining, by the at least one processor and using the machine-learned model, a plurality of dot product scores associated with the plurality of documents by performing a dot product of the query vector with each of the plurality of document vectors; and determining, by the at least one processor and using the machine-learned model, the one or more candidate documents to be hyperlinked from the sequence of one or more words out of the plurality of documents based at least in part on one or more dot product scores associated with the one or more candidate documents.

Example 4

The method of Example 3, wherein the query vector and the plurality of document vectors is each a multi-dimensional real-valued embedding vector.

Example 5

The method of any of Examples 3 and 4, wherein the machine-learned model is trained using machine learning such that the dot product score of the dot product of the query vector with a document vector associated with the second document represents a likelihood that the sequence of one or more words associated with the query vector links to the second document associated with the document vector.

Example 6

The method of any of Examples 3 to 5, further comprising: generating, by the at least one processor using the machine-learned model, the document vector associated with the second document based at least in part on one or more of: a subject of the second document, a title of the second document, content of the second document, a type of the second document, a time when the second document was created, the time when the second document was last opened, the time when the second document was last edited, a frequency of the second document being opened, a frequency of the second document being edited, a frequency of the second document being shared, one or more authors of the second document, one or more collaborators of the second document, sharing settings of the second document, or user-provided metadata associated with the second document.

Example 7

The method of any of Examples 3 to 6, wherein the machine-learned model is further trained via one or more of: next paragraph prediction, beginning of document prediction, or random paragraph prediction to determine the document vector associated with the second document.

Example 8

The method of any of Examples 3-7, wherein the machine-learned model is further trained via next message prediction.

Example 9

The method of any of Examples 3-8, wherein the machine-learned model is further trained using training data that includes pairs of first documents and second documents linked to or attached to the first documents.

Example 10

The method of any of examples 3-9, wherein the machine-learned model includes a classifier configured to provide one or more likelihood scores identifying a likelihood that the one or more words of the sequence are to be anchors for the hyperlink to the second document, and wherein the machine-learned model is configured to combine the likelihood score with one or more frequent link anchor patterns to determine a most likely anchor of the anchors for the hyperlink.

Example 11

The method of any of examples 3-9, wherein the machine-learned model includes a sequence-to-sequence model configured to predict one or more likelihood scores identifying a likelihood that the one or more words of the sequence are to be anchors for the hyperlink to the second document, and wherein the machine-learned model is configured to combine the likelihood score with one or more frequent link anchor patterns to determine a most likely anchor of the anchors for the hyperlink.

Example 12

The method of any of Examples 1 to 11, wherein the machine-learned model comprises a machine-trained classifier that classifies the sequence of one or more words as the candidate hyperlink based at least in part on the sequence of the one or more words and the context associated with the first document.

Example 13

The method of any of examples 1 to 12, wherein the context associated with the first document includes one or more of: textual context associated with the sequence of one or more words, an author of the first document, a recipient of the first document, a title of the first document, contents of the first document, activity associated with the first document, a time of when the first document was last edited, or previous messages in a thread of messages that includes the first document.

Example 14

A computing system comprising: a memory configured to store a machine-learned model; and one or more processors configured to: determine, using the machine-learned model, whether to classify a sequence of one or more words within a first document that is being edited as a candidate hyperlink based at least in part on the sequence of one or more words and context associated with the first document; in response to classifying the sequence of one or more words as the candidate hyperlink, determine, using the machine-learned model and based at least in part on the sequence of one or more words and the context, one or more candidate document to be hyperlinked from the sequence of one or more words out of a plurality of documents; and in response to receiving an indication of a second document being selected out of the one or more candidate documents, modify the first document to associate the sequence of one or more words with a hyperlink to the second document.

Example 15

The computing system of Example 14, wherein the one or more processors are further configured to: generate, using the machine-learned model, a query vector associated with the sequence of one or more words based at least in part on the sequence of one or more words and the context associated with the first document; generate, using the machine-learned model, a plurality of document vectors associated with the plurality of documents; determine, using the machine-learned model, a plurality of dot product scores associated with the plurality of documents by performing a dot product of the query vector with each of the plurality of document vectors; and determine, using the machine-learned model, the one or more candidate documents document to be hyperlinked from the sequence of one or more words out of the plurality of documents based at least in part on one or more dot product scores associated with the one or more candidate documents.

Example 16

The computing system of Example 15, wherein the query vector and the plurality of document vectors is each a multi-dimensional real-valued embedding vector.

Example 17

The computing system of any of Examples 15 and 16, wherein the machine-learned model is trained using machine learning such that the dot product score of the dot product of the query vector with a document vector associated with the document represents a likelihood that the sequence of one or more words associated with the query vector links to the second document associated with the document vector.

Example 18

The computing system of any of Examples 15-17, wherein the machine-learned model includes a classifier configured to provide one or more likelihood scores identifying a likelihood that the one or more words of the sequence are to be anchors for the hyperlink to the second document, and wherein the machine-learned model is configured to combine the likelihood score with one or more frequent link anchor patterns to determine a most likely anchor of the anchors for the hyperlink.

Example 19

The computing system of any of Examples 15-17, wherein the machine-learned model includes a sequence-to-sequence model configured to predict one or more likelihood scores identifying a likelihood that the one or more words of the sequence are to be anchors for the hyperlink to the second document, and wherein the machine-learned model is configured to combine the likelihood score with one or more frequent link anchor patterns to determine a most likely anchor of the anchors for the hyperlink.

Example 20

The computing system of any of Examples 12 to 19, wherein the machine-learned model comprises a machine-trained classifier that classifies the sequence of one or more words as the candidate hyperlink based at least in part on the sequence of one or more words and the context associated with the first document.

Example 21

A computer-readable storage medium including instructions that, when executed by at least one processor, cause the at least one processor to: determine, using a machine-learned model, whether to classify a sequence of one or more words within a first document that is being edited as a candidate hyperlink based at least in part on the sequence of one or more words and context associated with the first document; in response to classifying the sequence of one or more words as the candidate hyperlink, determine, using the machine-learned model and based at least in part on the sequence of one or more words and the context, one or more candidate document to be hyperlinked from the sequence of one or more words out of a plurality of documents; and in response to receiving an indication of a second document being selected out of the one or more candidate documents, modify the first document to associate the sequence of one or more words with a hyperlink to the second document.

Example 22

The computer-readable storage medium of Example 21, wherein the instructions, when executed by the at least one processor, further cause the at least one processor to: generate, using the machine-learned model, a query vector associated with the sequence of one or more words based at least in part on the sequence of one or more words and the context; generate, using the machine-learned model, a plurality of document vectors associated with the plurality of documents based at least in part on the plurality of document vectors; determine, using the machine-learned model, a plurality of dot product scores associated with the plurality of documents by performing a dot product of the query vector with each of the plurality of document vectors; and determine, using the machine-learned model, the one or more candidate documents document to be hyperlinked from the sequence of one or more words out of the plurality of documents based at least in part on one or more dot product scores associated with the one or more candidate documents.

Example 23

The computer-readable storage medium of Example 22, wherein the query vector and the plurality of document vectors is each a multi-dimensional real-valued embedding vector.

Example 24

The computer-readable storage medium of any of Examples 22 and 23, wherein the machine-learned model is trained using machine learning such that the dot product score of the dot product of the query vector with a document vector associated with the second document represents a likelihood that the sequence of one or more words associated with the query vector links to the second document associated with the document vector.

Example 25

The computer-readable storage medium of any of Examples 21-24, wherein the machine-learned model comprises a machine-trained classifier that classifies the sequence of one or more words as the candidate hyperlink based at least in part on the sequence of one or more words and the context associated with the first document.

Example 25

A computing system comprising: at least one processor configured to perform the method of any of Examples 1-13.

Example 26

An apparatus comprising means for performing the method of any of Examples 1-13.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    determining, by the at least one processor using a machine-learned model, whether to classify a word within an electronic message that is being edited as a candidate hyperlink based at least in part on the word and textual context associated with the word within the electronic message;
    in response to classifying the word as the candidate hyperlink, determining, by the at least one processor using the machine-learned model and based at least in part on the word and the textual context associated with the word, one or more candidate documents to be hyperlinked from the word out of a plurality of documents that only include documents that are accessible by an intended recipient of the electronic message and exclude documents that are not accessible by the intended recipient of the electronic message;
    in response to receiving an indication of a document being selected out of the one or more candidate documents, modifying, by the at least one processor, the electronic message to associate the word with a hyperlink to the document; and
    sending, by the at least one processor to a recipient, the electronic message that includes the hyperlink to the document.

2. The method of claim 1, wherein determining the one or more candidate documents to be hyperlinked from the word out of the plurality of documents further comprises:
    generating, by the at least one processor and using the machine-learned model, a query vector associated with the word based at least in part on the word and the textual context;
    generating, by the at least one processor and using the machine-learned model, a plurality of document vectors associated with the plurality of documents based at least in part on the plurality of document vectors;
    determining, by the at least one processor and using the machine-learned model, a plurality of dot product scores associated with the plurality of documents by performing a dot product of the query vector with each of the plurality of document vectors; and
    determining, by the at least one processor and using the machine-learned model, the one or more candidate documents document to be hyperlinked from the word out of the plurality of documents based at least in part on one or more dot product scores associated with the one or more candidate documents.

3. The method of claim 2, wherein the query vector and the plurality of document vectors is each an embedding vector.

4. The method of claim 2, wherein the machine-learned model is trained using machine learning such that the dot product score of the dot product of the query vector with a document vector associated with the document corresponds to a likelihood of the document being hyperlinked from the word associated with the query vector.

5. The method of claim 4, wherein the one or more dot product scores associated with the one or more candidate documents are each higher than remaining dot product scores associated with remaining documents of the plurality of documents.

6. The method of claim 4, further comprising:
generating, by the at least one processor using the machine-learned model, the document vector associated with the document based at least in part on one or more of: a subject of the document, a title of the document, a type of the document, a time when the document was last opened, a frequency of the document being opened, a frequency of the document being edited, or a frequency of the document being shared.

7. The method of claim 1, wherein the machine-learned model comprises a machine-trained classifier that classifies the word as the candidate hyperlink based at least in part on the word and textual context associated with the word within the electronic message.

8. A computing system comprising:
a memory configured to store a machine-learned model; and
one or more processors configured to:
determine, using the machine-learned model, whether to classify a word within an electronic message that is being edited as a candidate hyperlink based at least in part on the word and textual context associated with the word within the electronic message;
in response to classifying the word as the candidate hyperlink, determine, using the machine-learned model and based at least in part on the word and the textual context associated with the word, one or more candidate document to be hyperlinked from the word out of a plurality of documents that only include documents that are accessible by an intended recipient of the electronic message and exclude documents that are not accessible by the intended recipient of the electronic message;
in response to receiving an indication of a document being selected out of the one or more candidate documents, modify the electronic message to associate the word with a hyperlink to the document; and
send, to a recipient, the electronic message that includes the hyperlink to the document.

9. The computing system of claim 8, wherein the one or more processors are further configured to:
generate, using the machine-learned model, a query vector associated with the word based at least in part on the word and the textual context;
generate, using the machine-learned model, a plurality of document vectors associated with the plurality of documents based at least in part on the plurality of document vectors;
determine, using the machine-learned model, a plurality of dot product scores associated with the plurality of documents by performing a dot product of the query vector with each of the plurality of document vectors; and
determine, using the machine-learned model, the one or more candidate documents document to be hyperlinked from the word out of the plurality of documents based at least in part on one or more dot product scores associated with the one or more candidate documents.

10. The computing system of claim 9, wherein the query vector and the plurality of document vectors is each an embedding vector.

11. The computing system of claim 9, wherein the machine-learned model is trained using machine learning such that the dot product score of the dot product of the query vector with a document vector associated with the document corresponds to a likelihood of the document being hyperlinked from the word associated with the query vector.

12. The computing system of claim 11, wherein the one or more dot product scores associated with the one or more candidate documents are each higher than remaining dot product scores associated with remaining documents of the plurality of documents.

13. The computing system of claim 11, wherein the one or more processors are further configured to:
generate, using the machine-learned model, the document vector associated with the document based at least in part on one or more of: a subject of the document, a title of the document, a type of the document, a time when the document was last opened, a frequency of the document being opened, a frequency of the document being edited, or a frequency of the document being shared.

14. The computing system of claim 8, wherein the machine-learned model comprises a machine-trained classifier that classifies the word as the candidate hyperlink based at least in part on the word and textual context associated with the word within the electronic message.

15. A computer-readable storage medium including instructions that, when executed by at least one processor, cause the at least one processor to: determine, using the machine-learned model, whether to classify a word within an electronic message that is being edited as a candidate hyperlink based at least in part on the word and textual context associated with the word within the electronic message;
in response to classifying the word as the candidate hyperlink, determine, using the machine-learned model and based at least in part on the word and the textual context associated with the word, one or more candidate document to be hyperlinked from the word out of a plurality of documents that only include documents that are accessible by an intended recipient of the electronic message and exclude documents that are not accessible by the intended recipient of the electronic message;
in response to receiving an indication of a document being selected out of the one or more candidate documents, modify the electronic message to associate the word with a hyperlink to the document; and
send, to a recipient, the electronic message that includes the hyperlink to the document.

16. The computer-readable storage medium of claim 15, wherein the instructions, when executed by the at least one processor, further causes the at least one processor to:
generate, using the machine-learned model, a query vector associated with the word based at least in part on the word and the textual context;
generate, using the machine-learned model, a plurality of document vectors associated with the plurality of documents based at least in part on the plurality of document vectors;
determine, using the machine-learned model, a plurality of dot product scores associated with the plurality of documents by performing a dot product of the query vector with each of the plurality of document vectors; and
determine, using the machine-learned model, the one or more candidate documents document to be hyperlinked from the word out of the plurality of documents based at least in part on one or more dot product scores associated with the one or more candidate documents.

17. The computer-readable storage medium of claim 16, wherein the query vector and the plurality of document vectors is each an embedding vector.

18. The computer-readable storage medium of claim 16, wherein the machine-learned model is trained using machine learning such that the dot product score of the dot product of the query vector with a document vector associated with the document corresponds to a likelihood of the document being hyperlinked from the word associated with the query vector.

19. The computer-readable storage medium of claim 18, wherein the one or more dot product scores associated with the one or more candidate documents are each higher than remaining dot product scores associated with remaining documents of the plurality of documents.

20. The computer-readable storage medium of claim 18, wherein the instructions, when executed by the at least one processor, further causes the at least one processor to:
   generate, using the machine-learned model, the document vector associated with the document based at least in part on one or more of: a subject of the document, a title of the document, a type of the document, a time when the document was last opened, a frequency of the document being opened, a frequency of the document being edited, or a frequency of the document being shared.

* * * * *